(12) United States Patent
Chen et al.

(10) Patent No.: US 11,375,579 B2
(45) Date of Patent: Jun. 28, 2022

(54) MULTI-MEMBER BLUETOOTH DEVICE CAPABLE OF ADAPTIVELY SWITCHING OPERATION MODE IN RESPONSE TO DATA TYPE CHANGE OF RECEIVED PACKETS, AND RELATED MAIN BLUETOOTH CIRCUIT AND AUXILIARY BLUETOOTH CIRCUIT

(71) Applicant: Realtek Semiconductor Corp., Hsinchu (TW)

(72) Inventors: Yi-Cheng Chen, Hsinchu (TW); Kuan-Chung Huang, Hsinchu (TW); Chia Chun Hung, Hsinchu (TW); Hou Wei Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 124 days.

(21) Appl. No.: 17/031,175

(22) Filed: Sep. 24, 2020

(65) Prior Publication Data

US 2021/0105865 A1   Apr. 8, 2021

Related U.S. Application Data

(60) Provisional application No. 62/909,783, filed on Oct. 3, 2019.

(30) Foreign Application Priority Data

Aug. 14, 2020   (TW) .................................. 109127806

(51) Int. Cl.
*H04W 88/04* (2009.01)
*H04L 49/552* (2022.01)
*H04W 4/80* (2018.01)

(52) U.S. Cl.
CPC .......... *H04W 88/04* (2013.01); *H04L 49/552* (2013.01); *H04W 4/80* (2018.02)

(58) Field of Classification Search
None
See application file for complete search history.

(56) References Cited

U.S. PATENT DOCUMENTS 9,203,895 B1 * 12/2015 Sauer ...................... G06F 30/30
10,187,179 B1   1/2019 Jorgovanovic
(Continued)

FOREIGN PATENT DOCUMENTS

| CN | 104320699 A | 1/2015 |
|---|---|---|
| CN | 104320843 A | 1/2015 |

(Continued)

OTHER PUBLICATIONS

Japanese Notification of Reasons for Refusal for Japanese Application No. 2020-163968, dated Aug. 31, 2021, with an English translation.

(Continued)

*Primary Examiner* — Robert M Morlan
(74) *Attorney, Agent, or Firm* — Birch, Stewart, Kolasch & Birch, LLP

(57) ABSTRACT

A multi-member Bluetooth device for communicating data with a remote Bluetooth device is disclosed including: a main Bluetooth circuit and an auxiliary Bluetooth circuit. In the period during which the auxiliary Bluetooth circuit operates at a sniffing mode, the auxiliary Bluetooth circuit sniffs packets transmitted from the remote Bluetooth device and the main Bluetooth circuit receives packets transmitted from the remote Bluetooth device. But the auxiliary Bluetooth circuit switches from the sniffing mode to a relay mode if the data type of packets transmitted from the remote Bluetooth device changes. In the period during which the (Continued)

auxiliary Bluetooth circuit operates at the relay mode, the main Bluetooth circuit receives packets transmitted from the remote Bluetooth device and forwards the received packets to the auxiliary Bluetooth circuit, and the auxiliary Bluetooth circuit does not sniff packets transmitted from the remote Bluetooth device.

9 Claims, 11 Drawing Sheets

(56) References Cited

U.S. PATENT DOCUMENTS

| | | | |
|---|---|---|---|
| 10,581,998 B2 | 3/2020 | Wang et al. | |
| 2009/0213804 A1 | 8/2009 | Yoon et al. | |
| 2014/0269614 A1 | 9/2014 | Maguire et al. | |
| 2015/0124976 A1 | 5/2015 | Pedersen | |
| 2015/0295982 A1 | 10/2015 | Kafle et al. | |
| 2016/0057703 A1* | 2/2016 | Benoit | H04W 56/00 370/311 |
| 2017/0093613 A1 | 3/2017 | Albrecht et al. | |
| 2018/0077493 A1 | 3/2018 | Watson et al. | |
| 2018/0084456 A1 | 3/2018 | Gostev et al. | |
| 2018/0084606 A1* | 3/2018 | Li | H04W 88/04 |
| 2018/0234777 A1 | 8/2018 | Roeck et al. | |
| 2018/0317126 A1 | 11/2018 | Wang et al. | |
| 2019/0174232 A1 | 6/2019 | Tong et al. | |
| 2019/0349682 A1 | 11/2019 | Hsu | |
| 2020/0053611 A1 | 2/2020 | Jorgovanovic et al. | |
| 2020/0252993 A1 | 8/2020 | Srivastava et al. | |
| 2021/0303254 A1 | 9/2021 | Wang et al. | |

FOREIGN PATENT DOCUMENTS

| | | |
|---|---|---|
| CN | 107018484 A | 8/2017 |
| CN | 108040308 B | 7/2018 |
| CN | 108337595 A | 7/2018 |
| KR | 10-2009-0091634 A | 8/2009 |
| KR | 10-2015-0133777 A | 11/2015 |
| WO | WO 2013/082578 A1 | 3/2013 |

OTHER PUBLICATIONS

Taiwanese Search Report and Office Action, dated May 21, 2021, for Taiwanese Application No. 109127807, with an English translation of the Taiwanese Search Report and a partial English translation of the Taiwanese Office.
Bluetooth, "Bluetooth Core Specification Version 5.1", Bluetooth SIG Proprietary, vol. 2, Jan. 21, 2019, pp. 491-493 and pp. 625-628 (8 pages total).
Korean Office Action for Korean Application No. 10-2020-0127510, dated Jan. 26, 2022, with English translation.
U.S. Office Action for U.S. Appl. No. 17/026,448, dated Feb. 22, 2022.
Chinese Office Action and Search Report for Chinese Application No. 202010783866.X, dated May 19, 2021, with English translation.
Korean Office Action for Korean Application No. 10-2020-0127480, dated Jun. 7, 2021, with English translation.
Korean Office Action for Korean Application No. 10-2020-0127507, dated Jun. 7, 2021, with English translation.
Korean Office Action for Korean Application No. 10-2020-0127518, dated Jun. 7, 2021, with.
Taiwanese Office Action and Search Report for Taiwanese Application No. 109127184, dated Jun. 16, 2021, with English translation.
Taiwanese Office Action and Search Report for Taiwanese Application No. 109127185, dated Jun. 16, 2021, with English translation.
Japanese Office Action for Japanese Application No. 2020-164032, dated Oct. 12, 2021, with English translation.
Japanese Office Action for Japanese Application No. 2020-164046, dated Oct. 12, 2021, with English translation.
Taiwanese Office Action and Search Report for Taiwanese Application No. 109127186, dated Apr. 30, 2021 with partial English translation.
Taiwanese Notice of Allowance and Search Report, dated May 31, 2021, for Taiwanese Application No. 109127806, with English translations.
Korean Office Action, dated Jun. 29, 2021, for Korean Application No. 10-2020-0127514, with an English translation.
U.S. Office Action for U.S. Appl. No. 17/026,982, dated May 13, 2022.

* cited by examiner

MULTI-MEMBER BLUETOOTH DEVICE CAPABLE OF ADAPTIVELY SWITCHING OPERATION MODE IN RESPONSE TO DATA TYPE CHANGE OF RECEIVED PACKETS, AND RELATED MAIN BLUETOOTH CIRCUIT AND AUXILIARY BLUETOOTH CIRCUIT

CROSS-REFERENCE TO RELATED APPLICATIONS

This application claims the benefit of priority to Patent Application No. 109127806, filed in Taiwan on Aug. 14, 2020; the entirety of which is incorporated herein by reference for all purposes.

This application claims the benefit of priority to U.S. Provisional Application Ser. No. 62/909,783, filed on Oct. 3, 2019; the entirety of which is incorporated herein by reference for all purposes.

BACKGROUND

The disclosure generally relates to a Bluetooth technology and, more particularly, to a multi-member Bluetooth device capable of adaptively switching operation mode in response to data type change of received packets, and related main Bluetooth circuit and auxiliary Bluetooth circuit utilized in the multi-member Bluetooth device.

A multi-member Bluetooth device is a Bluetooth device formed by multiple Bluetooth circuits cooperating with each other, such as, a pair of Bluetooth earphones, a set of Bluetooth speakers, or the like. When the multi-member Bluetooth device connects to another Bluetooth device (hereinafter referred to as a remote Bluetooth device), the remote Bluetooth device treats the multi-member Bluetooth device as a single Bluetooth device. The conventional multi-member Bluetooth device configures one of member circuits to be a main Bluetooth circuit for conducting a bidirectional data transmission with the remote Bluetooth device, and configures other member circuits to be auxiliary Bluetooth circuits.

In practical applications, the data type of packets transmitted from the remote Bluetooth device to the multi-member Bluetooth device may change as the operation scenario changes. For example, when the remote Bluetooth device utilizes the multi-member Bluetooth device to playback video data, the packets transmitted from the remote Bluetooth device to the multi-member Bluetooth device are usually multimedia data with a sequence number. However, when the remote Bluetooth device transmits data required for updating the firmware or versions of programs to the multi-member Bluetooth device, the packets transmitted from the remote Bluetooth device to the multi-member Bluetooth device are usually non-multimedia data without having sequence numbers, such as, program data, update modules, or the like.

When the data type of the packets issued from the remote Bluetooth device changes, if the cooperation between the main Bluetooth circuit and the auxiliary Bluetooth circuit does not adjust adaptively, it may easily degrade the overall operating performance of the multi-member Bluetooth device, reduce the standby time of the multi-member Bluetooth device, cause inconvenience in the usage, or even unable to complete specific operation (e.g., firmware update).

SUMMARY

An example embodiment of a multi-member Bluetooth device utilized to operably conduct data transmission with a remote Bluetooth device is disclosed. The multi-member Bluetooth device comprises a main Bluetooth circuit, comprising: a first Bluetooth communication circuit; a first packet parsing circuit, arranged to operably parse packets received by the first Bluetooth communication circuit; and a first control circuit, coupled with the first Bluetooth communication circuit and the first packet parsing circuit; and an auxiliary Bluetooth circuit, arranged to selectably operate at a sniffing mode or a relay mode, the auxiliary Bluetooth circuit comprising: a second Bluetooth communication circuit; a second packet parsing circuit, arranged to operably parse packets received by the second Bluetooth communication circuit; and a second control circuit, coupled with the second Bluetooth communication circuit and the second packet parsing circuit; wherein in a period during which the auxiliary Bluetooth circuit operates at the sniffing mode, the first control circuit utilizes the first Bluetooth communication circuit to receive packets transmitted from the remote Bluetooth device, and the second control circuit utilizes the second Bluetooth communication circuit to sniff packets issued from the remote Bluetooth device; in a situation of that a data type of the packets transmitted from the remote Bluetooth device changes, the auxiliary Bluetooth circuit switches from the sniffing mode to the relay mode; and in a period during which the auxiliary Bluetooth circuit operates at the relay mode, the second control circuit does not utilize the second Bluetooth communication circuit to sniff the packets issued from the remote Bluetooth device, the first control circuit utilizes the first Bluetooth communication circuit to receive the packets transmitted from the remote Bluetooth device, and utilizes the first Bluetooth communication circuit to forward received packets to the auxiliary Bluetooth circuit, and the second control circuit utilizes the second Bluetooth communication circuit to receive packets forwarded from the first Bluetooth communication circuit.

Another example embodiment of a main Bluetooth circuit of a multi-member Bluetooth device utilized to operably conduct data transmission with a remote Bluetooth device and comprising the main Bluetooth circuit and an auxiliary Bluetooth circuit which selectably operates at a sniffing mode or a relay mode is disclosed. The main Bluetooth circuit comprises a first Bluetooth communication circuit; a first packet parsing circuit, arranged to operably parse packets received by the first Bluetooth communication circuit; and a first control circuit, coupled with the first Bluetooth communication circuit and the first packet parsing circuit; wherein in a period during which the auxiliary Bluetooth circuit operates at the sniffing mode, the first control circuit utilizes the first Bluetooth communication circuit to receive packets transmitted from the remote Bluetooth device, and the auxiliary Bluetooth circuit sniffs packets issued from the remote Bluetooth device; in a situation of that a data type of the packets transmitted from the remote Bluetooth device changes, the auxiliary Bluetooth circuit switches from the sniffing mode to the relay mode; and in a period during which the auxiliary Bluetooth circuit operates at the relay mode, the auxiliary Bluetooth circuit does not sniff the packets issued from the remote Bluetooth device, the first control circuit utilizes the first Bluetooth communication circuit to receive the packets transmitted from the remote Bluetooth device, and utilizes the first Bluetooth communication circuit to forward received packets to the auxiliary Bluetooth circuit.

Another example embodiment of an auxiliary Bluetooth circuit of a multi-member Bluetooth device utilized to operably conduct data transmission with a remote Bluetooth device and comprising a main Bluetooth circuit and the auxiliary Bluetooth circuit is disclosed. The auxiliary Bluetooth circuit comprises a second Bluetooth communication circuit; a second packet parsing circuit, arranged to operably parse packets received by the second Bluetooth communication circuit; and a second control circuit, coupled with the second Bluetooth communication circuit and the second packet parsing circuit, arranged to operably control operations of the auxiliary Bluetooth circuit under a sniffing mode and a relay mode; wherein in a period during which the auxiliary Bluetooth circuit operates at the sniffing mode, the main Bluetooth circuit receives packets transmitted from the remote Bluetooth device, and the second control circuit utilizes the second Bluetooth communication circuit to sniff packets issued from the remote Bluetooth device; in a situation of that a data type of the packets transmitted from the remote Bluetooth device changes, the auxiliary Bluetooth circuit switches from the sniffing mode to the relay mode; and in a period during which the auxiliary Bluetooth circuit operates at the relay mode, the second control circuit does not utilize the second Bluetooth communication circuit to sniff the packets issued from the remote Bluetooth device, the main Bluetooth circuit receives the packets transmitted from the remote Bluetooth device and forwards received packets to the auxiliary Bluetooth circuit, and the second control circuit utilizes the second Bluetooth communication circuit to receive packets forwarded from the main Bluetooth circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
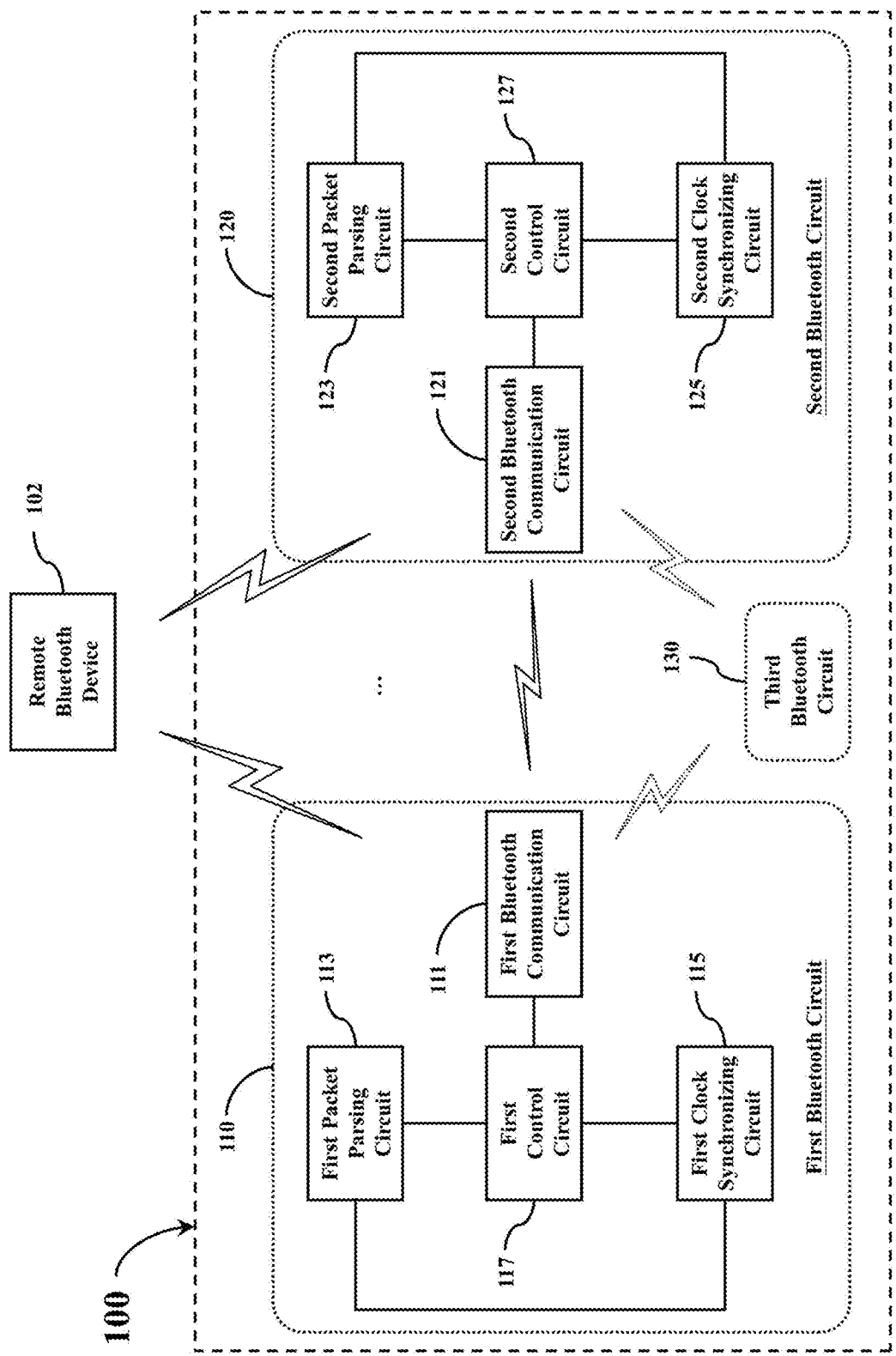
FIG. 1 shows a simplified functional block diagram of a multi-member Bluetooth device according to one embodiment of the present disclosure.

FIG. 1 shows a simplified functional block diagram of a multi-member Bluetooth device 100 according to one embodiment of the present disclosure. The multi-member Bluetooth device 100 is arranged to operably conduct data transmission with a remote Bluetooth device 102, and comprises multiple member circuits. For the convenience of description, only three member circuits are illustrated in the embodiment of FIG. 1, which respectively are a first Bluetooth circuit 110, a second Bluetooth circuit 120, and a third Bluetooth circuit 130.

In this embodiment, all member circuits of the multi-member Bluetooth device 100 have a similar main circuit structure, but different additional circuit components may be arranged in different member circuits, rather than restricting all member circuits to have an identical circuit structure. As shown in FIG. 1, for example, the first Bluetooth circuit 110 comprises a first Bluetooth communication circuit 111, a first packet parsing circuit 113, a first clock synchronizing circuit 115, and a first control circuit 117. Similarly, the second Bluetooth circuit 120 comprises a second Bluetooth communication circuit 121, a second packet parsing circuit 123, a second clock synchronizing circuit 125, and a second control circuit 127.

The main circuit components inside the third Bluetooth circuit 130 are similar to the situation of the aforementioned first Bluetooth circuit 110 and second Bluetooth circuit 120. For the sake of brevity, the interior circuit components of the third Bluetooth circuit 130 are not shown in FIG. 1.

In the first Bluetooth circuit 110, the first Bluetooth communication circuit 111 is arranged to operably conduct data communication with other Bluetooth devices. The first packet parsing circuit 113 is arranged to operably parse packets received by the first Bluetooth communication circuit 111. The first clock synchronizing circuit 115 is coupled with the first packet parsing circuit 113, and arranged to operably adjust a clock signal adopted by the first Bluetooth circuit 110 so as to synchronize a piconet clock adopted by the first Bluetooth circuit 110 and other Bluetooth devices.

The first control circuit 117 is coupled with the first Bluetooth communication circuit 111, the first packet parsing circuit 113, and the first clock synchronizing circuit 115, and is arranged to operably control the operations of the aforementioned circuits. In operations, the first control circuit 117 may directly data communication with the remote Bluetooth device 102 through the first Bluetooth communication circuit 111 by using a Bluetooth wireless transmission approach, and may conduct data communication with other member circuits through the first Bluetooth communication circuit 111. The first control circuit 117 may further utilize the first packet parsing circuit 113 to parse the packets received by the first Bluetooth communication circuit 111 so as to acquire related data or instructions.

In the second Bluetooth circuit 120, the second Bluetooth communication circuit 121 is arranged to operably conduct data communication with other Bluetooth devices. The second packet parsing circuit 123 is arranged to operably parse the packets received by the second Bluetooth communication circuit 121. The second clock synchronizing circuit 125 is coupled with the second packet parsing circuit 123, and arranged to operably adjust a clock signal adopted by the second Bluetooth circuit 120 so as to synchronize the piconet clock adopted by the second Bluetooth circuit 120 and other Bluetooth devices.

The second control circuit 127 is coupled with the second Bluetooth communication circuit 121, the second packet parsing circuit 123, and the second clock synchronizing circuit 125, and is arranged to operably control the operations of the aforementioned circuits. In operations, the second control circuit 127 may conduct data communication with other Bluetooth devices through the second Bluetooth communication circuit 121 by using the Bluetooth wireless transmission approach, and may conduct data communication with other member circuits through the second Bluetooth communication circuit 121. The second control circuit 127 may further utilize the second packet parsing circuit 123 to parse the packets received by the second Bluetooth communication circuit 121 so as to acquire related data or instructions.

In practice, each of the aforementioned first Bluetooth communication circuit 111 and second Bluetooth communication circuit 121 may be realized with appropriate wireless communication circuits supporting various versions of Bluetooth communication protocols. Each of the aforementioned first packet parsing circuit 113 and second packet parsing circuit 123 may be realized with various packet demodulating circuits, digital processing circuits, microprocessors, or ASICs (Application Specific Integrated Circuits). Each of the aforementioned first clock synchronizing circuit 115 and second clock synchronizing circuit 125 may be realized with various appropriate circuits capable of comparing and adjusting clock frequency and/or clock phase. Each of the aforementioned first control circuit 117 and second control circuit 127 may be realized with various micro-processors or digital signal processing circuits having appropriate computing capability.

In some embodiments, the first clock synchronizing circuit 115 and the second clock synchronizing circuit 125 may be respectively integrated into the first control circuit 117 and the second control circuit 127. In addition, the aforementioned first packet parsing circuit 113 and second packet parsing circuit 123 may be respectively integrated into the aforementioned first Bluetooth communication circuit 111 and second Bluetooth communication circuit 121.

In other words, the aforementioned first Bluetooth communication circuit 111 and first packet parsing circuit 113 may be realized with separate circuits, or may be realized with the same circuit. Similarly, the aforementioned second Bluetooth communication circuit 121 and second packet parsing circuit 123 may be realized with separate circuits, or may be realized with the same circuit.

In applications, different functional blocks of the aforementioned first Bluetooth circuit 110 may be integrated into a single circuit chip. For example, all functional blocks of the first Bluetooth circuit 110 may be integrated into a single Bluetooth controller IC. Similarly, all functional blocks of the second Bluetooth circuit 120 may be integrated into another single Bluetooth controller IC.

As can be appreciated from the foregoing descriptions, different member circuits of the multi-member Bluetooth device 100 may conduct data communication with one another through respective Bluetooth communication circuits, so as to form various types of data network or data link. When the multi-member Bluetooth device 100 conducts data communication with the remote Bluetooth device 102, the remote Bluetooth device 102 treats the multi-member Bluetooth device 100 as a single Bluetooth device, and the multiple member circuits of the multi-member Bluetooth device 100 would select one member circuit to act as a main Bluetooth circuit for handling major operation of receiving packets issued from the remote Bluetooth device 102, and other member circuits act as auxiliary Bluetooth circuits.

The main Bluetooth circuit may adopt various existing mechanisms to receive the packets issued from the remote Bluetooth device 102, and during the operation of the main Bluetooth circuit, the auxiliary Bluetooth circuit may acquire the packets issued from the remote Bluetooth device 102 by adopting appropriate mechanisms.

For example, in a period during which the main Bluetooth circuit receives the packets issued from the remote Bluetooth device 102, the auxiliary Bluetooth circuit may operate at a sniffing mode to actively sniff the packets issued from the remote Bluetooth device 102. Alternatively, the auxiliary Bluetooth circuit may operate at a relay mode to passively receive the packets forwarded from the main Bluetooth circuit after the packets issued from the remote Bluetooth device 102 are received by the main Bluetooth circuit, and does not actively sniff the packets issued from the remote Bluetooth device 102. Respective operations of the main Bluetooth circuit and the auxiliary Bluetooth circuit in the foregoing two situations will be described in detail in the following paragraphs.

Please note that two terms "main Bluetooth circuit" and "auxiliary Bluetooth circuit" used throughout the description and claims are merely for the purpose of distinguishing different approaches of receiving packets issued from the remote Bluetooth device 102 adopted by different member circuits, rather than indicating that the main Bluetooth circuit is required to has a specific level of control authority over other operational aspects of the auxiliary Bluetooth circuit.

In addition, during the operation of the multi-member Bluetooth device 100, the main Bluetooth circuit and the auxiliary Bluetooth circuit may dynamically exchange their roles. For example, the main Bluetooth circuit may intermittently evaluate its operating parameters such as a computing loading, a remaining power, a temperature and/or an operating environment, and hand over its role to another auxiliary Bluetooth circuit in the situation where the aforementioned operating parameters matches specific predetermined conditions.

For another example, the main Bluetooth circuit may intermittently compare the aforementioned operating parameters of the main Bluetooth circuit with the aforementioned operating parameters of other auxiliary Bluetooth circuits, and hand over the role of the main Bluetooth circuit to another auxiliary Bluetooth circuit in the situation where a difference between the operating parameters of the main Bluetooth circuit and the operating parameters of the auxiliary Bluetooth circuit exceeds a predetermined degree.

For another example, the main Bluetooth circuit may intermittently compare its Bluetooth packet loss rate with the Bluetooth packet loss rate of other auxiliary Bluetooth circuits, and hand over the role of the main Bluetooth circuit to another auxiliary Bluetooth circuit in the situation where another auxiliary Bluetooth circuits has a lower Bluetooth packet loss rate.

In practice, the main Bluetooth circuit may take the aforementioned various evaluation criteria into consideration to conduct a comprehensive evaluation so as to determine whether to hand over the role of the main Bluetooth circuit to another auxiliary Bluetooth circuit.

Alternatively, the auxiliary Bluetooth circuit may adopt various approaches to determine whether the main Bluetooth circuit is disabled or missing, and in the situation where the auxiliary Bluetooth circuit determines that the main Bluetooth circuit is disabled or missing, the auxiliary Bluetooth circuit may take over the role of the former main Bluetooth circuit to proactively act as a new main Bluetooth circuit.

As described previously, the data type of the packets transmitted from the remote Bluetooth device 102 to the multi-member Bluetooth device 100 may change as the operation scenario changes in practical applications. For example, when the user manipulates the remote Bluetooth device 102 to utilize the multi-member Bluetooth device 100 to playback video data, the packets transmitted from the remote Bluetooth device 102 to the multi-member Bluetooth device 100 are usually multimedia data with a sequence number. However, when the user utilizes the remote Bluetooth device 102 to transmit data required for updating the firmware or versions of programs to the multi-member Bluetooth device 100, the packets transmitted from the remote Bluetooth device 102 to the multi-member Bluetooth device 100 are usually non-multimedia data without having sequence numbers, such as, program data, update modules, or the like. In the situation of that the data type of the packets issued from the remote Bluetooth device 102 changes, but the main Bluetooth circuit and the auxiliary Bluetooth circuit do not exchange their roles with each other, if the cooperation between the main Bluetooth circuit and the auxiliary Bluetooth circuit does not adjust adaptively, it may cause the main Bluetooth circuit to be unable to effectively confirm whether the auxiliary Bluetooth circuit misses any packet; may increase the power consumption, the heat generation, and/or the temperature of the main Bluetooth circuit; may reduce the comfort level in using the main Bluetooth circuit; may degrade the overall operating performance, and/or reduce the standby time of the multi-member Bluetooth device 100; may cause inconvenience in the usage of the multi-member Bluetooth device 100; and may cause the auxiliary Bluetooth circuit to easily miss packets and thus unable to complete specific operation (e.g., firmware update).

During the operations, the multi-member Bluetooth device 100 dynamically monitors whether the data type of the packets transmitted from the remote Bluetooth device 102 changes so as to avoid the aforementioned problems.

Figure 2:
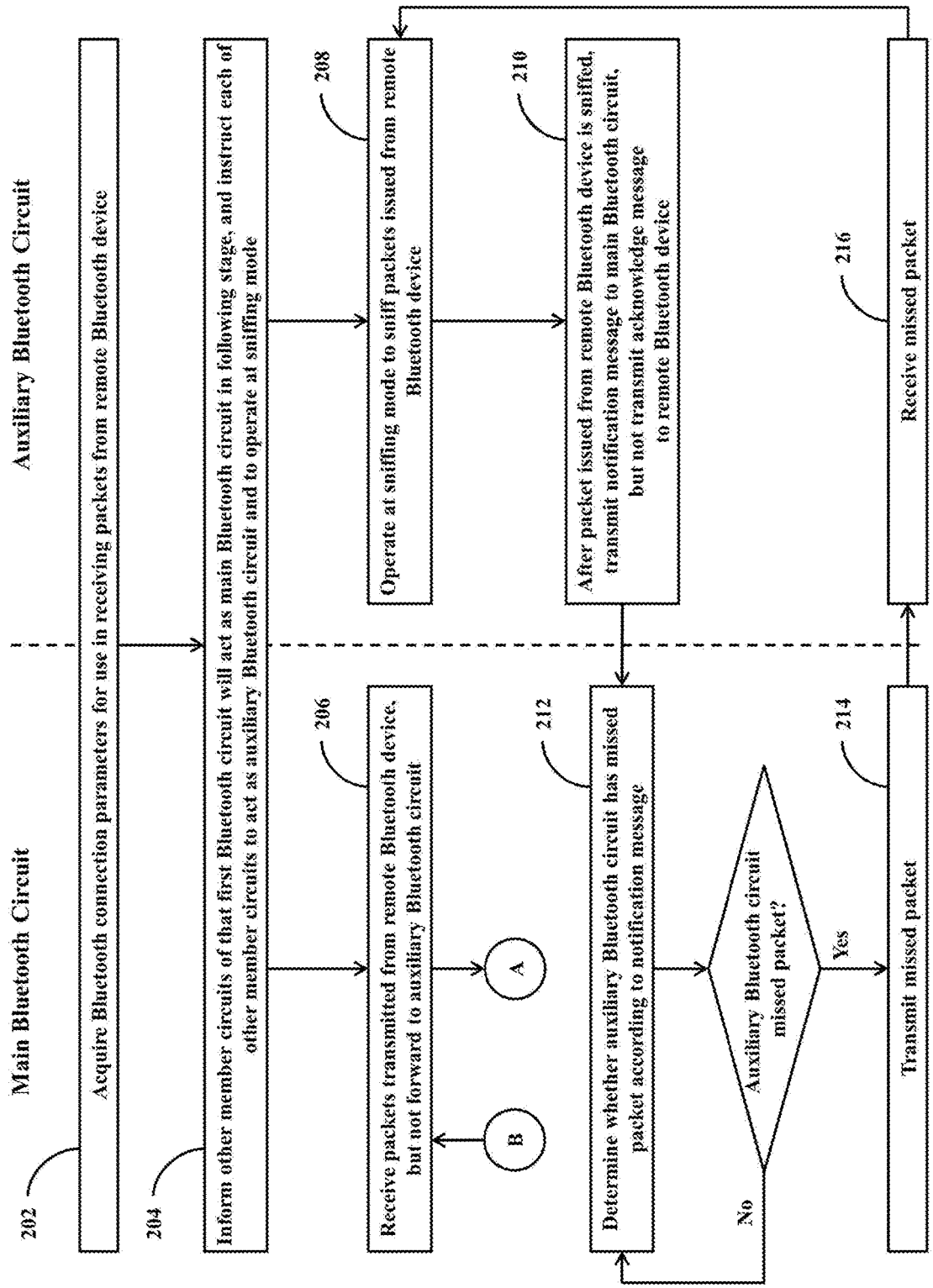
FIGS. 2~3 collectively show a simplified flowchart of an operation method of the multi-member Bluetooth device according to a first embodiment of the present disclosure.
Figure 3:
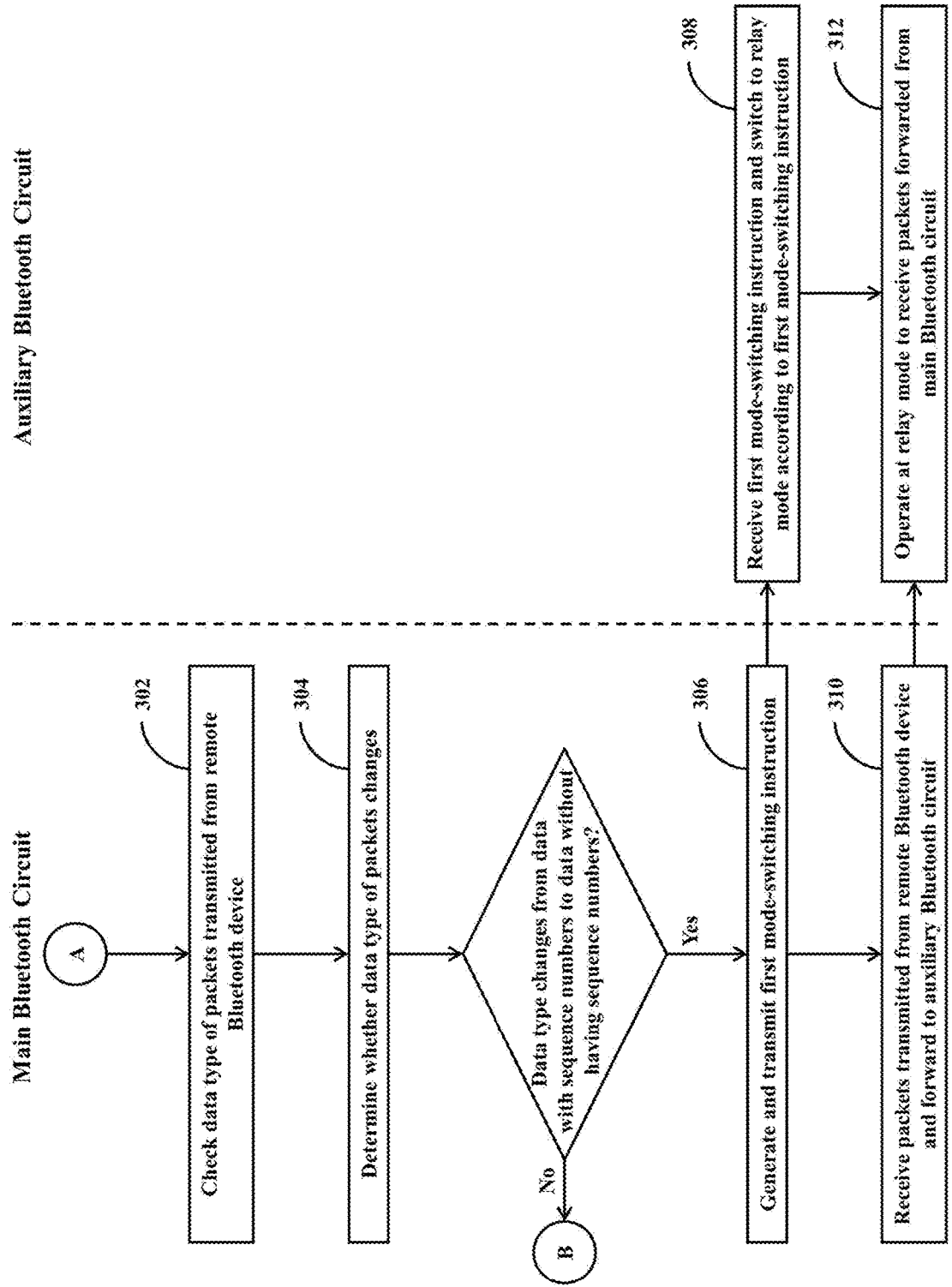

The operations of the multi-member Bluetooth device 100 will be further described in the following by reference to FIG. 2 and FIG. 3. FIGS. 2~3 collectively show a simplified flowchart of an operation method of the multi-member Bluetooth device 100 according to a first embodiment of the present disclosure.

In the flowcharts of FIGS. 2~3, operations within a column under the name of a specific device are operations to be performed by the specific device. For example, operations within a column under the label "main Bluetooth circuit" are operations to be performed by the member circuit acting as the main Bluetooth circuit; operations within a column under the label "auxiliary Bluetooth circuit" are operations to be performed by the member circuits acting as the auxiliary Bluetooth circuit; and so forth. The same analogous arrangement also applies to the subsequent flowcharts.

As shown in FIG. 2, when the user utilizes the multi-member Bluetooth device 100 to receive packets with sequence numbers (e.g., video data) issued from the remote Bluetooth device 102, the multi-member Bluetooth device 100 may perform the operation 202 first to acquire Bluetooth connection parameters for use in receiving the packets issued from the remote Bluetooth device 102. In practice, the multi-member Bluetooth device 100 may first utilize any one of the member circuits to connect with the remote Bluetooth device 102 to acquire related Bluetooth connection parameters, and then utilize the member circuit to transmit the acquired Bluetooth connection parameters to other member circuits.

In one embodiment, for example, the first control circuit 117 of the first Bluetooth circuit 110 may control the first Bluetooth communication circuit 111 to establish a Bluetooth connection with the remote Bluetooth device 102, and transmit the Bluetooth connection parameters adopted between the first Bluetooth circuit 110 and the remote Bluetooth device 102 to the second Bluetooth circuit 120 and other member circuits through the first Bluetooth communication circuit 111 in the operation 202, so that thereafter other member circuits can adopt the Bluetooth connection parameters to receive the packets issued from the remote Bluetooth device 102.

For another example, in another embodiment, the second control circuit 127 of the second Bluetooth circuit 120 may control the second Bluetooth communication circuit 121 to establish the Bluetooth connection with the remote Bluetooth device 102, and transmit the Bluetooth connection parameters adopted between the second Bluetooth circuit 120 and the remote Bluetooth device 102 to other member circuits through the second Bluetooth communication circuit 121 in the operation 202, so that thereafter other member circuits can adopt the Bluetooth connection parameters to receive the packets issued from the remote Bluetooth device 102. On the other hand, the second control circuit 127 may further transmit a device identification data of the second Bluetooth circuit 120 and the Bluetooth connection parameters adopted between the second Bluetooth circuit 120 and the remote Bluetooth device 102 to the first Bluetooth circuit 110 through the second Bluetooth communication circuit 121 in the operation 202, so that the first Bluetooth circuit 110 can conduct the bidirectional packet transmission with the remote Bluetooth device 102 in subsequent operations. Afterwards, the second Bluetooth circuit 120 would conduct a unidirectional packet receiving operation to receive packets issued from the remote Bluetooth device 102, and no longer transmit the packets to the remote Bluetooth device 102, so as to avoid the remote Bluetooth device 102 from packet conflict.

For the convenience of description, it is assumed hereinafter that the member circuit being currently selected among the member circuits of the multi-member Bluetooth device 100 to perform the major duty of receiving the packets issued from the remote Bluetooth device 102 is the first Bluetooth circuit 110, and each of the other member circuits (for example, the aforementioned second Bluetooth circuit 120 and the third Bluetooth circuit 130) acts as an auxiliary Bluetooth circuit.

In the operation 204, through the first Bluetooth communication circuit 111, the first Bluetooth circuit 110 may inform other member circuits in the multi-member Bluetooth device 100 (e.g., the aforementioned second Bluetooth circuit 120 and third Bluetooth circuit 130) of that the first Bluetooth circuit 110 will play the role of the main Bluetooth circuit in the following stage, and may instruct each of other member circuits to play the role of the auxiliary Bluetooth circuit and to operate at the sniffing mode. That is, the first Bluetooth circuit 110 will perform the major operation of receiving the packets issued from the remote Bluetooth device 102 in the following stage, and other member circuits are only allowed to sniff the packets issued from the remote Bluetooth device 102 and not allowed to transmit instructions, data, or other related packets to the remote Bluetooth device 102.

Afterwards, in a period during which the auxiliary Bluetooth circuit operates at the sniffing mode, the first Bluetooth circuit 110 performs the operation 206.

In the operation 206, the first control circuit 117 of the first Bluetooth circuit 110 utilizes the first Bluetooth communication circuit 111 to receive the packets with sequence numbers transmitted from the remote Bluetooth device 102, but the first control circuit 117 does not forward the packets transmitted from the remote Bluetooth device 102 to other auxiliary Bluetooth circuits through the first Bluetooth communication circuit 111.

In operations, the first control circuit 117 may adopt the Bluetooth connection parameters acquired in the operation 202 to conduct packet transmission with the remote Bluetooth device 102 through the first Bluetooth communication circuit 111, so as to receive various packets transmitted from the remote Bluetooth device 102 or to transmit various packets to the remote Bluetooth device 102. As can be appreciated from the foregoing descriptions of the operation 202, the Bluetooth connection parameters adopted by the first Bluetooth circuit 110 in conducting packet transmission with the remote Bluetooth device 102 may be acquired by itself, or may be received from other member circuits (e.g., the second Bluetooth circuit 120).

At each time the first Bluetooth communication circuit 111 receives a packet transmitted from the remote Bluetooth device 102, the first control circuit 117 of the first Bluetooth circuit 110 may transmit a corresponding acknowledge message to the remote Bluetooth device 102 through the first Bluetooth communication circuit 111. If the remote Bluetooth device 102 does not receive a corresponding acknowledge message of a specific packet, it will retransmit the specific packet to the first Bluetooth communication circuit 111. In practice, the first Bluetooth circuit 110 and the remote Bluetooth device 102 may adopt various appropriate packet handshake mechanisms to reduce or avoid packet loss.

On the other hand, in the period during which the main Bluetooth circuit receives the packets issued from the remote Bluetooth device 102, other member circuits acting as the auxiliary Bluetooth circuits perform the operation 208 to continuously operate at the sniffing mode to sniff the packets with sequence numbers issued from the remote Bluetooth device 102. For example, in the operation 208, the second control circuit 127 of the second Bluetooth circuit 120 may utilize the second Bluetooth communication circuit 121 to sniff the packets issued from the remote Bluetooth device 102 according to the Bluetooth connection parameters acquired in the operation 202. In one embodiment, the second Bluetooth communication circuit 121 may sniff all of the Bluetooth packets issued from the remote Bluetooth device 102. In another embodiment, the second Bluetooth communication circuit 121 only sniffs the Bluetooth packets transmitted from the remote Bluetooth device 102 to the first Bluetooth circuit 110, but does not sniff the Bluetooth packets transmitted from the remote Bluetooth device 102 to devices other than the multi-member Bluetooth device 100. As can be appreciated from the foregoing descriptions of the operation 202, the Bluetooth connection parameters adopted by the second Bluetooth communication circuit 121 in sniffing the packets issued from the remote Bluetooth device 102 may be acquired by itself, or may be received from other member circuits (e.g., the first Bluetooth circuit 110).

At each time a packet issued from the remote Bluetooth device 102 is sniffed by the auxiliary Bluetooth circuit, the auxiliary Bluetooth circuit may perform the operation 210. In the operation 210, the auxiliary Bluetooth circuit transmits a notification message corresponding to the sniffed packet to the main Bluetooth circuit, but does not transmit any acknowledge message to the remote Bluetooth device 102. For example, at each time a packet issued from the remote Bluetooth device 102 is sniffed by the second Bluetooth circuit 120, the second control circuit 127 may perform the operation 210 to transmit a corresponding notification message to the first Bluetooth communication circuit 111 of the first Bluetooth circuit 110 through the second Bluetooth communication circuit 121, but the second control circuit 127 does not transmit any acknowledge message to the remote Bluetooth device 102 through the second Bluetooth communication circuit 121.

In practice, the auxiliary Bluetooth circuit may perform the aforementioned operation 210 only when the main Bluetooth circuit inquires whether or not a specific packet issued from the remote Bluetooth device 102 is sniffed by the auxiliary Bluetooth circuit.

In other words, in the period during which the auxiliary Bluetooth circuit operates at the sniffing mode, both the main Bluetooth circuit and other auxiliary Bluetooth circuits of this embodiment receive the packets issued from the remote Bluetooth device 102, but only the main Bluetooth circuit transmits an acknowledge message to the remote Bluetooth device 102 when receiving a packet, and other auxiliary Bluetooth circuits do not transmit any acknowledge message to the remote Bluetooth device 102, so as to prevent the remote Bluetooth device 102 from misjudgment. Since the remote Bluetooth device 102 does not aware of that the second Bluetooth circuit 120 is sniffing the packets issued from the remote Bluetooth device 102, nor does the second Bluetooth circuit 120 transmit any corresponding acknowledge message to the remote Bluetooth device 102, it is apparent that no packet handshake procedure is conducted between the second Bluetooth circuit 120 and the remote Bluetooth device 102 for the packets issued from the remote Bluetooth device 102.

In this embodiment, the purpose of that the second Bluetooth circuit 120 transmits the aforementioned notification message to the first Bluetooth circuit 110 is not for conducting a packet handshake procedure with the first Bluetooth circuit 110, but for enabling the first Bluetooth circuit 110 to clarify whether any packet issued from the remote Bluetooth device 102 is missed by the second Bluetooth circuit 120.

In addition, the purpose of that the second Bluetooth circuit 120 transmits the aforementioned notification message to the first Bluetooth circuit 110 is neither for the first Bluetooth circuit 110 to decide whether to transmit the aforementioned acknowledge message to the remote Bluetooth device 102. Before the first control circuit 117 of this embodiment transmits the aforementioned acknowledge message to the remote Bluetooth device 102, the first control circuit 117 does not check whether the first Bluetooth communication circuit 111 has received the aforementioned notification message transmitted from the second Bluetooth circuit 120. Accordingly, the timing of that the first Bluetooth communication circuit 111 transmits the acknowledge message to the remote Bluetooth device 102 is irrelevant to whether the first Bluetooth communication circuit 111 has received the aforementioned notification message transmitted from the second Bluetooth circuit 120.

In practice, the aforementioned notification message transmitted from the second Bluetooth circuit 120 to the first Bluetooth circuit 110 may be realized with various appropriate data formats. For example, when a specific Bluetooth packet transmitted from the remote Bluetooth device 102 is received by the second Bluetooth circuit 120, the second control circuit 127 may extract a corresponding sequence number from the specific Bluetooth packet, and combine or encode the sequence number with a device identification code or a device identification data for identifying the second Bluetooth circuit 120 to form a notification message corresponding to the specific Bluetooth packet. For another example, the second control circuit 127 may extract appropriate packet identification data from the specific Bluetooth packet, and combine or encode the packet identification data with the device identification code or the device identification data for identifying the second Bluetooth circuit 120 to form the notification message corresponding to the specific Bluetooth packet.

As can be appreciated from the foregoing descriptions, in the period during which the remote Bluetooth device 102 successively issues multiple Bluetooth packets, each of the auxiliary Bluetooth circuits repeats the aforementioned operation 208 and operation 210 to thereby transmit multiple notification messages to the first Bluetooth circuit 110 in normal situation. For example, the second Bluetooth circuit 120 may repeat the operation 208 and the operation 210 to transmit multiple notification messages respectively corresponding to the multiple Bluetooth packets issued from the remote Bluetooth device 102 to the first Bluetooth circuit 110.

In practical operations, respective auxiliary Bluetooth circuit might miss some packets issued from the remote Bluetooth device 102, and different auxiliary Bluetooth circuits might miss different packets or different quantities of packets. Accordingly, the main Bluetooth circuit may intermittently or periodically perform the operation 212 to determine whether each auxiliary Bluetooth circuit has missed some packets issued from the remote Bluetooth device 102 according to the multiple notification messages transmitted from respective auxiliary Bluetooth circuit.

In the operation 212, for example, the first control circuit 117 of the first Bluetooth circuit 110 may examine whether some packets issued from the remote Bluetooth device 102 are missed by the second Bluetooth circuit 120 according to the multiple notification messages transmitted from the second Bluetooth circuit 120. The first packet parsing circuit 113 may parse multiple sequence numbers or multiple packet identification data from the multiple notification messages transmitted from the second Bluetooth circuit 120. The first control circuit 117 may check whether these sequence numbers or packet identification data are consecutive, so as to examine whether some packets issued from the remote Bluetooth device 102 are missed by the second Bluetooth circuit 120. In the situation where the aforementioned sequence numbers or packet identification data are not consecutive, the first control circuit 117 then can determine that the packets corresponding to the missing sequence numbers or packet identification data are missed by the second Bluetooth circuit 120. According to the missing sequence numbers or missing packet identification data, the first control circuit 117 can further identify which packets are missed by the second Bluetooth circuit 120.

As can be appreciated from the foregoing descriptions, a packet handshake mechanism is adopted between the first Bluetooth circuit 110 and the remote Bluetooth device 102, thus the first Bluetooth circuit 110 should be able to successfully acquire all of the packets issued from the remote Bluetooth device 102 in normal situation.

If the first control circuit 117 determines that some packets issued from the remote Bluetooth device 102 are missed by a specific auxiliary Bluetooth circuit, the first control circuit 117 performs the operation 214 to transmit the packets missed by the auxiliary Bluetooth circuit to the auxiliary Bluetooth circuit through the first Bluetooth communication circuit 111.

For example, in the situation where the first control circuit 117 determines that a specific packet issued from the remote Bluetooth device 102 is missed by the second Bluetooth circuit 120, the first control circuit 117 may perform the operation 214 to transmit the packet missed by the second Bluetooth circuit 120 to the second Bluetooth circuit 120 through the first Bluetooth communication circuit 111.

In this situation, the second Bluetooth circuit 120 performs the operation 216 to receive the packet transmitted from the first Bluetooth circuit 110 through the second Bluetooth communication circuit 121. In other words, in the period during which the second Bluetooth circuit 120 operates at the sniffing mode, the second control circuit 127 may utilize the second Bluetooth communication circuit 121 to receive the packets transmitted from the first Bluetooth circuit 110 so as to acquire the packets issued from the remote Bluetooth device 102 but missed by the second Bluetooth communication circuit 121.

By repeating the aforementioned operations, the second Bluetooth circuit 120 may acquire all of the missed packets with the assistance of the first Bluetooth circuit 110. Similarly, the first Bluetooth circuit 110 may assist other auxiliary Bluetooth circuits to acquire the missed packets by adopting the aforementioned approach.

In the period during which the auxiliary Bluetooth circuit operates at the sniffing mode, if an auxiliary Bluetooth circuit needs to transmit instructions, data or related packets to the remote Bluetooth device 102, the instructions, data or related packets need to be forwarded to the remote Bluetooth device 102 through the main Bluetooth circuit. For example, if the second Bluetooth circuit 120 needs to transmit the instructions, data or related packets to the remote Bluetooth device 102, the second Bluetooth circuit 120 needs to transmit the aforementioned instructions, data or related packets through the second Bluetooth communication circuit 121 to the first Bluetooth circuit 110 which plays the role of the main Bluetooth circuit, and then the first Bluetooth circuit 110 will forward the aforementioned instructions, data or related packets to the remote Bluetooth device 102, so as to avoid the remote Bluetooth device 102 from packet conflict.

In other words, in the period during which the auxiliary Bluetooth circuit operates at the sniffing mode, all of the member circuits of the multi-member Bluetooth device 100 would receive the packets issued from the remote Bluetooth device 102, but only the main Bluetooth circuit is allowed to transmit instructions, data or other related packets to the remote Bluetooth device 102.

As can be appreciated from the foregoing descriptions, the first Bluetooth circuit 110 and the remote Bluetooth device 102 adopt appropriate packet handshake mechanism to avoid packet loss. In addition, the timing of that the first Bluetooth communication circuit 111 transmits the acknowledge message to the remote Bluetooth device 102 is irrelevant to whether the first Bluetooth communication circuit 111 has received the aforementioned notification message from the second Bluetooth circuit 120.

Accordingly, the operation of that other auxiliary Bluetooth circuits transmit corresponding notification messages to the first Bluetooth circuit 110 when they receive the packets issued from the remote Bluetooth device 102 would not cause interference or delay to the packet handshake procedure conducted between the first Bluetooth circuit 110 and the remote Bluetooth device 102, neither would it cause additional operating burden on the first Bluetooth circuit 110 in conducting the aforementioned packet handshake procedure.

On the other hand, since other auxiliary Bluetooth circuits (e.g., the aforementioned second Bluetooth circuit 120 and the third Bluetooth circuit 130) in the multi-member Bluetooth device 100 sniff the packets issued from the remote Bluetooth device 102, each of the auxiliary Bluetooth circuits may acquire most of the packets issued from the remote Bluetooth device 102 in normal situation. Therefore, the first Bluetooth circuit 110 currently acting as the main Bluetooth circuit only needs to transmit the packets missed by respective auxiliary Bluetooth circuits to the corresponding auxiliary Bluetooth circuit, and does not need to transmit all of the packets issued from the remote Bluetooth device 102 to each of the auxiliary Bluetooth circuits.

Therefore, the multi-member Bluetooth device 100 could significantly reduce the packet forward loading of the main Bluetooth circuit (e.g., the first Bluetooth circuit 110 in this embodiment) by adopting the approach of FIG. 2 to interact with the remote Bluetooth device 102, thereby reducing the power consumption of the main Bluetooth circuit. In this way, the serving time and the standby time of the main Bluetooth circuit can be effectively extended.

Additionally, adopting the approach of FIG. 2 can also significantly reduce the bandwidth requirement for data transmission between the main Bluetooth circuit and other member circuits, and thus it could simplify the hardware design of the main Bluetooth circuit and other member circuits, and/or reduce the circuit complexity and circuit cost of the main Bluetooth circuit and other member circuits.

In operations, various existing data synchronization mechanisms may be adopted between the main Bluetooth circuit and other auxiliary Bluetooth circuits to ensure that different member circuits are able to synchronically playback the multimedia data transmitted from the remote Bluetooth device 102, thereby avoiding the situation where different member circuits have inconsistent playback timings from occurring.

As can be appreciated from the foregoing descriptions, in the period during which the auxiliary Bluetooth circuit operates at the sniffing mode, although the main Bluetooth circuit and the auxiliary Bluetooth circuit do not exchange their roles with each other, the data type of the packets transmitted from the remote Bluetooth device 102 to the multi-member Bluetooth device 100 may change as the user changes the operation scenario of the multi-member Bluetooth device 100. When the data type of the packets issued from the remote Bluetooth device 102 changes, if the cooperation between the main Bluetooth circuit and the auxiliary Bluetooth circuit does not adjust adaptively, it may cause the main Bluetooth circuit to be unable to effectively confirm whether the auxiliary Bluetooth circuit misses any packet, may cause the auxiliary Bluetooth circuit to easily miss packets and thus unable to complete specific operation (e.g., firmware update), and/or may degrade the overall operating performance of the multi-member Bluetooth device 100. In some situations, it may reduce the service life or standby time of the auxiliary Bluetooth circuit or the main Bluetooth circuit. In addition, in respect to some conventional multi-member Bluetooth devices realized with wireless Bluetooth earphones, if the user wants to change the operation scenario of the multi-member Bluetooth device, the user usually has to temporarily take off the multi-member Bluetooth device and place the multi-member Bluetooth device into a specific equipment (e.g., an earphone charging stand or an earphone charging case), so as to conduct a specific operation (e.g., update the firmware of the multi-member Bluetooth device), which would obviously cause inconvenience in the usage for the user.

In this embodiment, as shown in FIG. 3, in the period during which the auxiliary Bluetooth circuit operates at the sniffing mode, the first Bluetooth circuit 110 acting as the main Bluetooth circuit may further perform the operation 302 intermittently to check the data type of the packets transmitted from the remote Bluetooth device 102. For example, the first control circuit 117 of the first Bluetooth circuit 110 may utilize the first packet parsing circuit 113 to parse contents of packets received by the first Bluetooth communication circuit 111 (i.e., packets transmitted from the remote Bluetooth device 102) and check the data type of the above packets. In practice, the first control circuit 117 may read contents from a sequence number field in the packet transmitted from the remote Bluetooth device 102, so as to classify the data type of the packet to be either data with a sequence number or data without having sequence numbers.

Then, the first control circuit 117 may perform the operation 304 to determine whether the data type of the packets transmitted from the remote Bluetooth device 102 changes. In practice, the first control circuit 117 may temporarily store the data type of packets transmitted earlier from the remote Bluetooth device 102 in an appropriate storage circuit (which is not shown in figures), so as to compare the data type of the packets transmitted earlier to the data type of packets transmitted currently from the remote Bluetooth device 102. In the operation 304, the first control circuit 117 may compare the data type of the packets transmitted earlier with the data type of the packets transmitted currently from the remote Bluetooth device 102 so as to determine whether the data type of packets transmitted from the remote Bluetooth device 102 changes from data with a sequence number to data without having sequence numbers.

If the data type of the packets transmitted currently from the remote Bluetooth device 102 is still data with a sequence number, it usually means that the operation scenario of the multi-member Bluetooth device 100 does not change. In this situation, the first Bluetooth circuit 110 may repeat the aforementioned operation 206, operation 212, and operation 214, and the second Bluetooth circuit 120 may continue to operate at the sniffing mode.

On the contrary, if the data type of the packets transmitted currently from the remote Bluetooth device 102 changes to be data without having sequence numbers, it usually means that the operation scenario of the multi-member Bluetooth device 100 has changed. When the data type of the packets transmitted from the remote Bluetooth device 102 changes to data without having sequence numbers, it is more difficult for the main Bluetooth circuit to effectively confirm whether the auxiliary Bluetooth circuit misses any packet, therefore it may cause the auxiliary Bluetooth circuit to easily miss packets and thus unable to complete specific operation (e.g., firmware update). In this situation, the first Bluetooth circuit 110 may perform the operation 306.

In the operation 306, the first control circuit 117 of the first Bluetooth circuit 110 generates a first mode-switching instruction for instructing the second Bluetooth circuit 120 to switch from the sniffing mode to the relay mode, and transmits the first mode-switching instruction to the second Bluetooth circuit 120 through the first Bluetooth communication circuit 111.

In the operation 308, the second Bluetooth communication circuit 121 receives the first mode-switching instruction transmitted from the first Bluetooth circuit 110, and the second control circuit 127 switches the operation mode of the second Bluetooth circuit 120 from the sniffing mode to the relay mode according to the first mode-switching instruction.

Then, the first Bluetooth circuit 110 performs operation 310, and the second Bluetooth circuit 120 performs operation 312.

In the operation 310, the first control circuit 117 of the first Bluetooth circuit 110 utilizes the first Bluetooth communication circuit 111 to receive the packets without having sequence numbers transmitted from the remote Bluetooth device 102 and forwards the received packets to the second Bluetooth circuit 120 through the first Bluetooth communication circuit 111.

In the operation 312, the second control circuit 127 controls the second Bluetooth circuit 120 to operate at the relay mode and utilizes the second Bluetooth communication circuit 121 to receive the packets without having sequence numbers forwarded from the first Bluetooth circuit 110. But in the period during which the second Bluetooth circuit 120 operates at the relay mode, the second control circuit 127 does not utilize the second Bluetooth communication circuit 121 to sniff the packets issued from the remote Bluetooth device 102. In other words, in the period during which the second Bluetooth circuit 120 operates at the relay mode, the second Bluetooth circuit 120 indirectly acquires the packets issued from the remote Bluetooth device 102 through the first Bluetooth circuit 110.

As can be appreciated from the foregoing descriptions, in the period during which the second Bluetooth circuit 120 acting as the auxiliary Bluetooth circuit operates at the sniffing mode, the first Bluetooth circuit 110 acting as the main Bluetooth circuit intermittently checks and determines whether the data type of the packets transmitted from the remote Bluetooth device 102 changes from data with a sequence number to data without having sequence numbers. The first Bluetooth circuit 110 does not instruct the second Bluetooth circuit 120 to switch to the relay mode as long as the data type of the packets transmitted from the remote Bluetooth device 102 is still data with a sequence number. In this situation, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, and thus it can reduce the operating loading, the power consumption, and the heat generation of the first Bluetooth circuit 110, and also extend the serving time and the standby time of the first Bluetooth circuit 110, and reducing the bandwidth requirement for data transmission between the first Bluetooth circuit 110 and the second Bluetooth circuit 120

The first Bluetooth circuit 110 instructs the second Bluetooth circuit 120 to switch its operation mode from the sniffing mode to the relay mode only if the data type of the packets transmitted from the remote Bluetooth device 102 changes from data with a sequence number to data without having sequence numbers. In this situation, the first Bluetooth circuit 110 would forward all of the packets issued from the remote Bluetooth device 102 to the second Bluetooth circuit 120, and the second Bluetooth circuit 120 would stop sniffing the packets issued from the remote Bluetooth device 102, and thus it can effectively avoid the second Bluetooth circuit 120 from missing packets. As a result, it can avoid the second Bluetooth circuit 120 from not completing a specific operation (e.g., firmware update) due to missing packets.

Similarly, the multi-member Bluetooth device 100 may adaptively switch the operation mode of the third Bluetooth circuit 130 according to the change of the data type of the packets transmitted from the remote Bluetooth device 102 as elaborated above.

Therefore, by adopting the operation methods of aforementioned FIG. 2 and FIG. 3, the main Bluetooth circuit of the multi-member Bluetooth device 100 may adaptively switch the operation mode of the auxiliary Bluetooth circuit from the sniffing mode to the relay mode and correspondingly change the cooperation between the main Bluetooth circuit and the auxiliary Bluetooth circuit, when the data type of the packets transmitted from the remote Bluetooth device 102 changes from data with a sequence number to data without having sequence numbers. In this way, it can effectively avoid the auxiliary Bluetooth circuit from not completing the specific operation (e.g., firmware update) due to missing packets, thereby improving the overall performance of the multi-member Bluetooth device 100, extending the service life of the Bluetooth circuit, or improving the user's experience.

Moreover, in some applications where the multi-member Bluetooth device 100 is realized with wireless Bluetooth earphones, the user may suddenly want to update the firmware of the multi-member Bluetooth device 100 when utilizing the multi-member Bluetooth device 100 to playback the multimedia data transmitted from the remote Bluetooth device 102. In this situation, by adopting the aforementioned operation methods in FIG. 2 and FIG. 3, the multi-member Bluetooth device 100 is enabled to allow the user to pause the multimedia playback operation of the multi-member Bluetooth device 100 at any time during utilizing the multi-member Bluetooth device 100 to playback the multimedia data transmitted from the remote Bluetooth device 102, and then to manipulate the remote Bluetooth device 102 to transmit the required program data or updating module for updating the firmware of the multi-member Bluetooth device 100 to the multi-member Bluetooth device 100. More important, in the period during which the aforementioned operation scenario switches, the user does not need to temporarily take off the multi-member Bluetooth device 100 from ears and place the multi-member Bluetooth device 100 into a specific equipment (e.g., an earphone charging stand or an earphone charging case), and thereof it can obviously improve the operational convenience for the user when utilizing the multi-member Bluetooth device 100.

In the aforementioned embodiment of FIG. 2 through FIG. 3, in the period during which the auxiliary Bluetooth circuit operates at the sniffing mode, the multi-member Bluetooth device 100 checks and determines whether the data type of the packets transmitted from the remote Bluetooth device 102 changes from data with the sequence numbers to data without having sequence numbers, and then decides whether to switch the operation mode of the auxiliary Bluetooth circuit from the sniffing mode to the relay mode according to the result of determination. But this is merely one embodiment, rather than a restriction to practical implements of this disclosure. In practice, the multi-member Bluetooth device 100 may dynamically determine whether to switch the operation mode of the auxiliary Bluetooth circuit according to changes of the data type of the packets transmitted from the remote Bluetooth device 102 in the period during which the auxiliary Bluetooth circuit operates at the relay mode.

Figure 4:
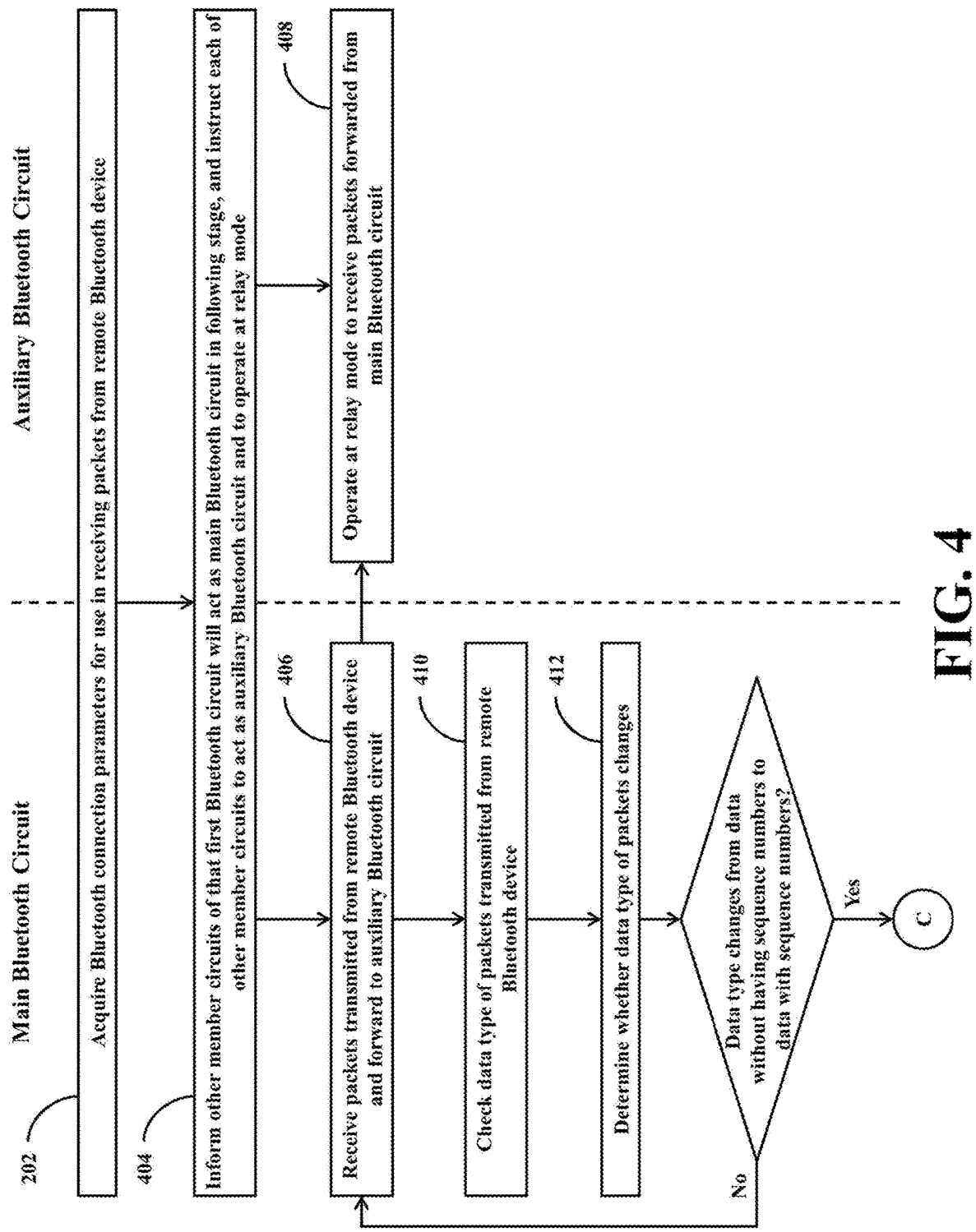
FIGS. 4~5 collectively show a simplified flowchart of an operation method of the multi-member Bluetooth device according to a second embodiment of the present disclosure.
Figure 5:
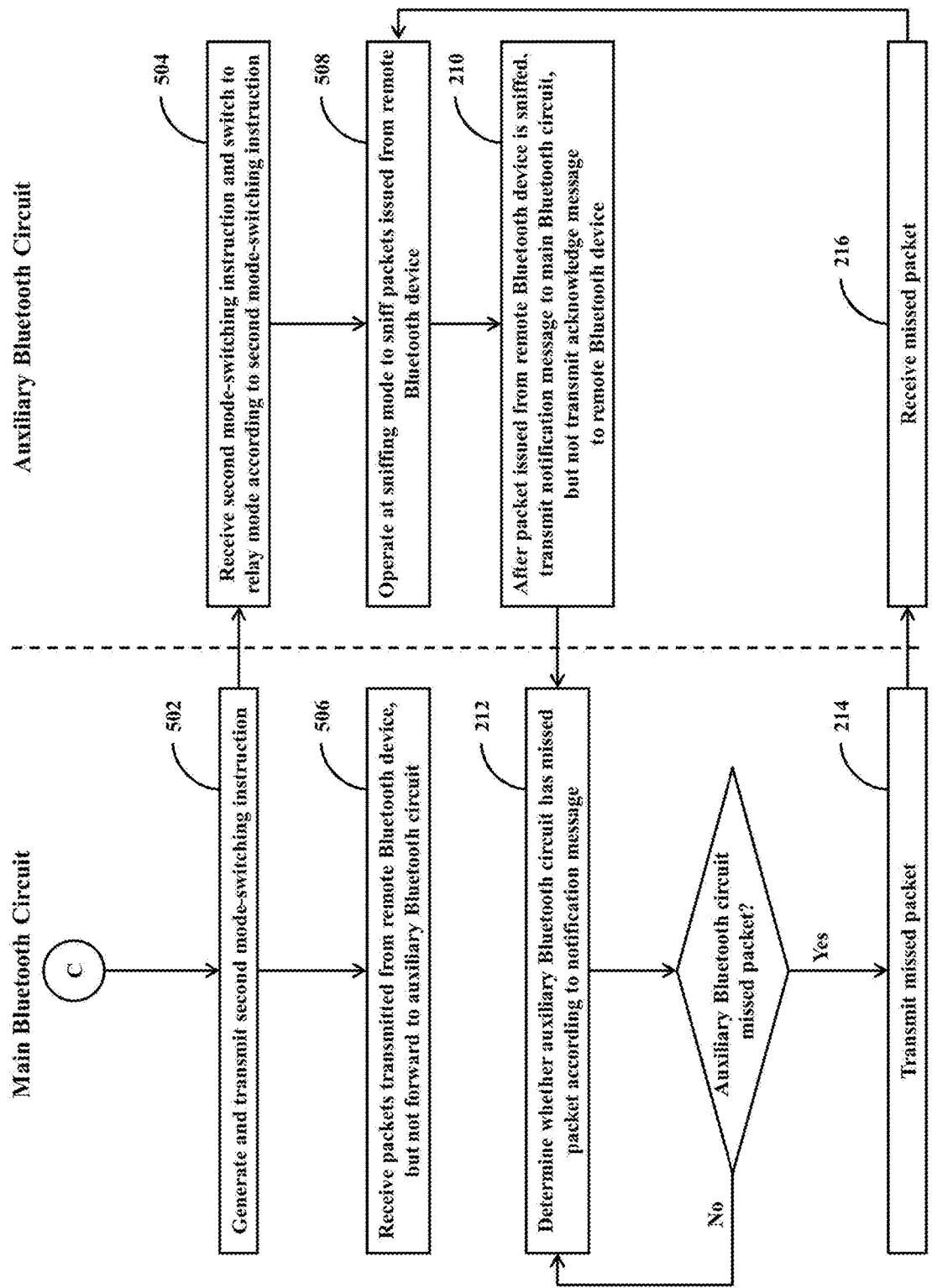

For example, FIGS. 4~5 collectively show a simplified flowchart of an operation method of the multi-member Bluetooth device 100 according to a second embodiment of the present disclosure.

As shown in FIG. 4, when the user wants to utilize the multi-member Bluetooth device 100 to receive packets without having sequence numbers (e.g., non-multimedia data such as program data, update modules, or the like) issued from the remote Bluetooth device 102, the multi-member Bluetooth device 100 may perform the aforementioned operation 202 first to acquire the Bluetooth connection parameters for use in receiving the packets issued from the remote Bluetooth device 102. The aforementioned descriptions regarding the operation methods and variations of the embodiments of the operation 202 in FIG. 2 are also applicable to the embodiments in FIG. 4.

For the convenience of description, it is similarly assumed hereinafter that the first Bluetooth circuit 110 is the member circuit being currently selected among the multi-member Bluetooth device 100 to perform the major duty of receiving the packets issued from the remote Bluetooth device 102, and each of the other member circuits (for example, the aforementioned second Bluetooth circuit 120 and the third Bluetooth circuit 130) acts as an auxiliary Bluetooth circuit.

In the operation 404, through the first Bluetooth communication circuit 111, the first Bluetooth circuit 110 may inform other member circuits in the multi-member Bluetooth device 100 (e.g., the aforementioned second Bluetooth circuit 120 and third Bluetooth circuit 130) of that the first Bluetooth circuit 110 will play the role of the main Bluetooth circuit in the following stage, and may instruct each of other member circuits to play the role of the auxiliary Bluetooth circuit and to operate at the relay mode. That is, the first Bluetooth circuit 110 will perform the major operation of receiving the packets issued from the remote Bluetooth device 102 in the following stage, and other member circuits only need to receive the packets forwarded from the first Bluetooth circuit 110 and do not need to sniff the packets issued from the remote Bluetooth device 102, and the other member circuits are not allowed to transmit instructions, data, or other related packets to the remote Bluetooth device 102.

Afterwards, in the period during which the auxiliary Bluetooth circuit operates at the relay mode, the first Bluetooth circuit 110 performs the operation 406.

In the operation 406, the first control circuit 117 of the first Bluetooth circuit 110 may utilize the first Bluetooth communication circuit 111 to receive the packets without having sequence numbers transmitted from the remote Bluetooth device 102, and the first control circuit 117 may also forward the packets without having sequence numbers transmitted from the remote Bluetooth device 102 to the other auxiliary Bluetooth circuits through the first Bluetooth communication circuit 111. For example, the first control circuit 117 may forward the packets without having sequence numbers transmitted from the remote Bluetooth device 102 to the second Bluetooth circuit 120 through the first Bluetooth communication circuit 111.

In operations, the first control circuit 117 may adopt the Bluetooth connection parameters acquired in the operation 202 to conduct packet transmission with the remote Bluetooth device 102 through the first Bluetooth communication circuit 111, so as to receive various packets transmitted from the remote Bluetooth device 102 or to transmit various packets to the remote Bluetooth device 102. As can be appreciated from the foregoing descriptions of the operation 202, the Bluetooth connection parameters adopted by the first Bluetooth circuit 110 in conducting packet transmission with the remote Bluetooth device 102 may be acquired by itself, or may be received from other member circuits (e.g., the second Bluetooth circuit 120).

As can be appreciated from the foregoing descriptions, the first Bluetooth circuit 110 and the remote Bluetooth device 102 may adopt various appropriate packet handshake mechanisms to reduce or avoid packet loss.

In the operation 408, the auxiliary Bluetooth circuit operates at the relay mode to receive the packets without having sequence numbers forwarded from the first Bluetooth circuit 110. In the period during which the auxiliary Bluetooth circuit operates at the relay mode, the auxiliary Bluetooth circuit does not sniff the packets issued from the remote Bluetooth device 102. In addition, in the period during which the auxiliary Bluetooth circuit operates at the sniffing mode, if the auxiliary Bluetooth circuit needs to transmit instructions, data, or related packets to the remote Bluetooth device 102, the auxiliary Bluetooth circuit has to forward the instructions, data, or related packets to the remote Bluetooth device 102 through the main Bluetooth circuit.

In the operation 408, for example, the second control circuit 127 may control the second Bluetooth circuit 120 to operate at the relay mode, and may utilize the second Bluetooth communication circuit 121 to receive the packets without having sequence numbers forwarded from the first Bluetooth circuit 110, but does not utilize the second Bluetooth communication circuit 121 to sniff the packets issued from the remote Bluetooth device 102. That is, in the period during which the second Bluetooth circuit 120 operates at the relay mode, the second Bluetooth circuit 120 indirectly acquires the packets without having sequence numbers issued from the remote Bluetooth device 102 through the first Bluetooth circuit 110. If the second Bluetooth circuit 120 needs to transmit instructions, data, or related packets to the remote Bluetooth device 102 during this period, the second Bluetooth circuit 120 has to transmit the above instructions, data, or related packets to the first Bluetooth circuit 110 acting as the main Bluetooth circuit through the second Bluetooth communication circuit 121 and forward the above instructions, data, or related packets to the remote Bluetooth device 102 through the first Bluetooth circuit 110 so as to avoid the remote Bluetooth device 102 from packet conflict.

As shown in FIG. 4, in the period during which the auxiliary Bluetooth circuit operates at the relay mode, the main Bluetooth circuit may further perform the operation 410 intermittently to check the data type of the packets transmitted from the remote Bluetooth device 102. For example, in the operation 410, the first control circuit 117 of the first Bluetooth circuit 110 may utilize the first packet parsing circuit 113 to parse contents in a particular field of the packets received by the first Bluetooth communication circuit 111 (i.e., packets transmitted from the remote Bluetooth device 102) so as to acquire the data type of the above packets. In practice, the first control circuit 117 may read contents from a sequence number field in the packet transmitted from the remote Bluetooth device 102 or contents from other predetermined fields, so as to classify the data type of the packet to be either data with a sequence number or data without having sequence numbers.

Then, the first control circuit 117 of this embodiment may perform the operation 412 to determine whether the data type of the packets transmitted from the remote Bluetooth device 102 changes. In practice, the first control circuit 117 may temporarily store the data type of the packets transmitted earlier from the remote Bluetooth device 102 in an appropriate storage circuit (which is not shown in figures), so as to compare the data type of the packets transmitted earlier to the data type of the packets transmitted currently from the remote Bluetooth device 102.

If the data type of the packets transmitted currently from the remote Bluetooth device 102 is still data without having sequence numbers, it usually means that the operation scenario of the multi-member Bluetooth device 100 does not change. In this situation, the first Bluetooth circuit 110 may repeat the aforementioned operation 406, operation 410, and operation 412, and the second Bluetooth circuit 120 may continue to operate at the relay mode.

On the contrary, if the data type of the packets transmitted currently from the remote Bluetooth device 102 changes to be data with a sequence number, it usually means that the operation scenario of the multi-member Bluetooth device 100 has changed. In this situation, the first Bluetooth circuit 110 may perform the operation 502 in FIG. 5

In the operation 502, the first control circuit 117 of the first Bluetooth circuit 110 generates a second mode-switching instruction for instructing the second Bluetooth circuit 120 to switch from the relay mode to the sniffing mode, and transmits the second mode-switching instruction to the second Bluetooth circuit 120 through the first Bluetooth communication circuit 111.

In the operation 504, the second Bluetooth communication circuit 121 receives the second mode-switching instruction transmitted from the first Bluetooth circuit 110, and the second control circuit 127 switches the operation mode of the second Bluetooth circuit 120 from the relay mode to the sniffing mode according to the second mode-switching instruction.

Then, the first Bluetooth circuit 110 performs the operation 506, and the second Bluetooth circuit 120 performs the operation 508.

In the operation 506, the first control circuit 117 of the first Bluetooth circuit 110 utilizes the first Bluetooth communication circuit 111 to receive the packets with sequence numbers transmitted from the remote Bluetooth device 102, but the first control circuit 117 does not forward the packets transmitted from the remote Bluetooth device 102 to the second Bluetooth circuit 120 through the first Bluetooth communication circuit 111.

In the operation 508, the second control circuit 127 of the second Bluetooth circuit 120 may utilize the second Bluetooth communication circuit 121 to sniff the packets with sequence numbers issued from the remote Bluetooth device 102 according to the Bluetooth connection parameters acquired in the operation 202. In one embodiment, the second Bluetooth communication circuit 121 may sniff all of the Bluetooth packets issued from the remote Bluetooth device 102. In another embodiment, the second Bluetooth communication circuit 121 only sniffs the Bluetooth packets transmitted from the remote Bluetooth device 102 to the first Bluetooth circuit 110, but does not sniff the Bluetooth packets transmitted from the remote Bluetooth device 102 to devices other than the multi-member Bluetooth device 100. As described previously regarding the operation 202, the Bluetooth connection parameters utilized by the second Bluetooth communication circuit 121 in sniffing the packets issued from the remote Bluetooth device 102 may be acquired by the second Bluetooth circuit 120, or may be transmitted from other member circuits (e.g., the first Bluetooth circuit 110).

Then, the multi-member Bluetooth device 100 may perform the aforementioned operation 210 through operation 216 in FIG. 2.

As can be appreciated from the foregoing descriptions, in the period during which the second Bluetooth circuit 120 acting as the auxiliary Bluetooth circuit operates at the relay mode, the first Bluetooth circuit 110 acting as the main Bluetooth circuit intermittently checks and determines whether the data type of the packets transmitted from the remote Bluetooth device 102 changes from data without having sequence numbers to data with a sequence number. The first Bluetooth circuit 110 does not instruct the second Bluetooth circuit 120 to switch to the sniffing mode as long as the data type of the packets transmitted from the remote Bluetooth device 102 is still data without having sequence numbers, so as to avoid the difficulty of confirming whether the second Bluetooth circuit 120 misses any packets issued from the remote Bluetooth device 102 in the following stages.

The first Bluetooth circuit 110 would instruct the second Bluetooth circuit 120 to switch the operation mode from the relay mode to the sniffing mode only if the data type of the packets transmitted from the remote Bluetooth device 102 changes from data without having sequence numbers to data with a sequence number. After the second Bluetooth circuit 120 switches to the sniffing mode, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

Similarly, the multi-member Bluetooth device 100 may adaptively switch the operation mode of the third Bluetooth circuit 130 according to the change of the data type of the packets transmitted from the remote Bluetooth device 102 as elaborated above.

Accordingly, by adopting the operation approach described in the aforementioned FIG. 4 and FIG. 5, the main Bluetooth circuit of the multi-member Bluetooth device 100 may adaptively switch the operation mode of the auxiliary Bluetooth circuit from the relay mode to the sniffing mode, and correspondingly adjust the cooperation between the main Bluetooth circuit and the auxiliary Bluetooth circuit when the data type of the packets transmitted from the remote Bluetooth device 102 changes from data without having sequence numbers to data with a sequence number. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 6:
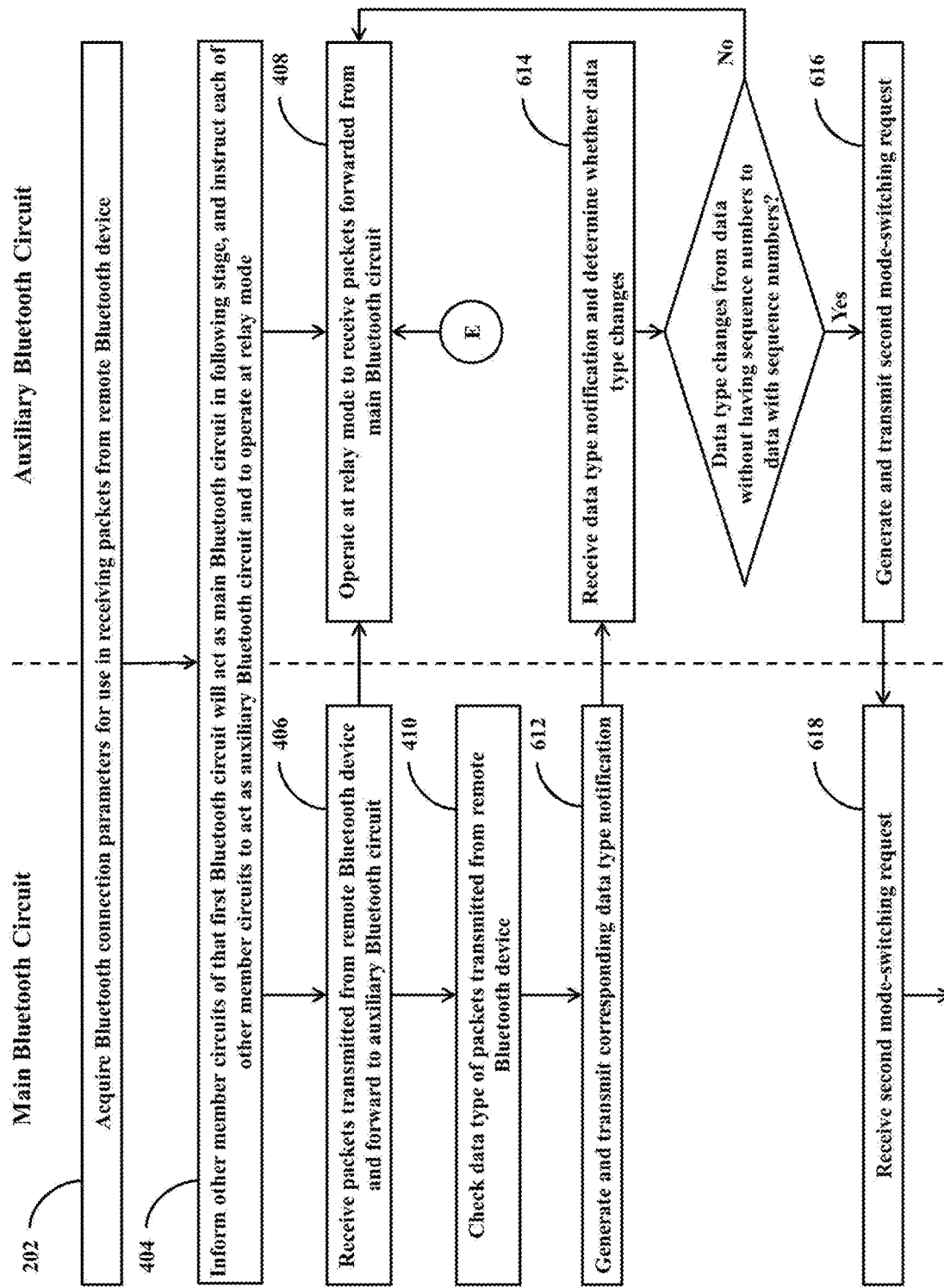
FIGS. 6~7 collectively show a simplified flowchart of an operation method of the multi-member Bluetooth device according to a third embodiment of the present disclosure.
Figure 7:
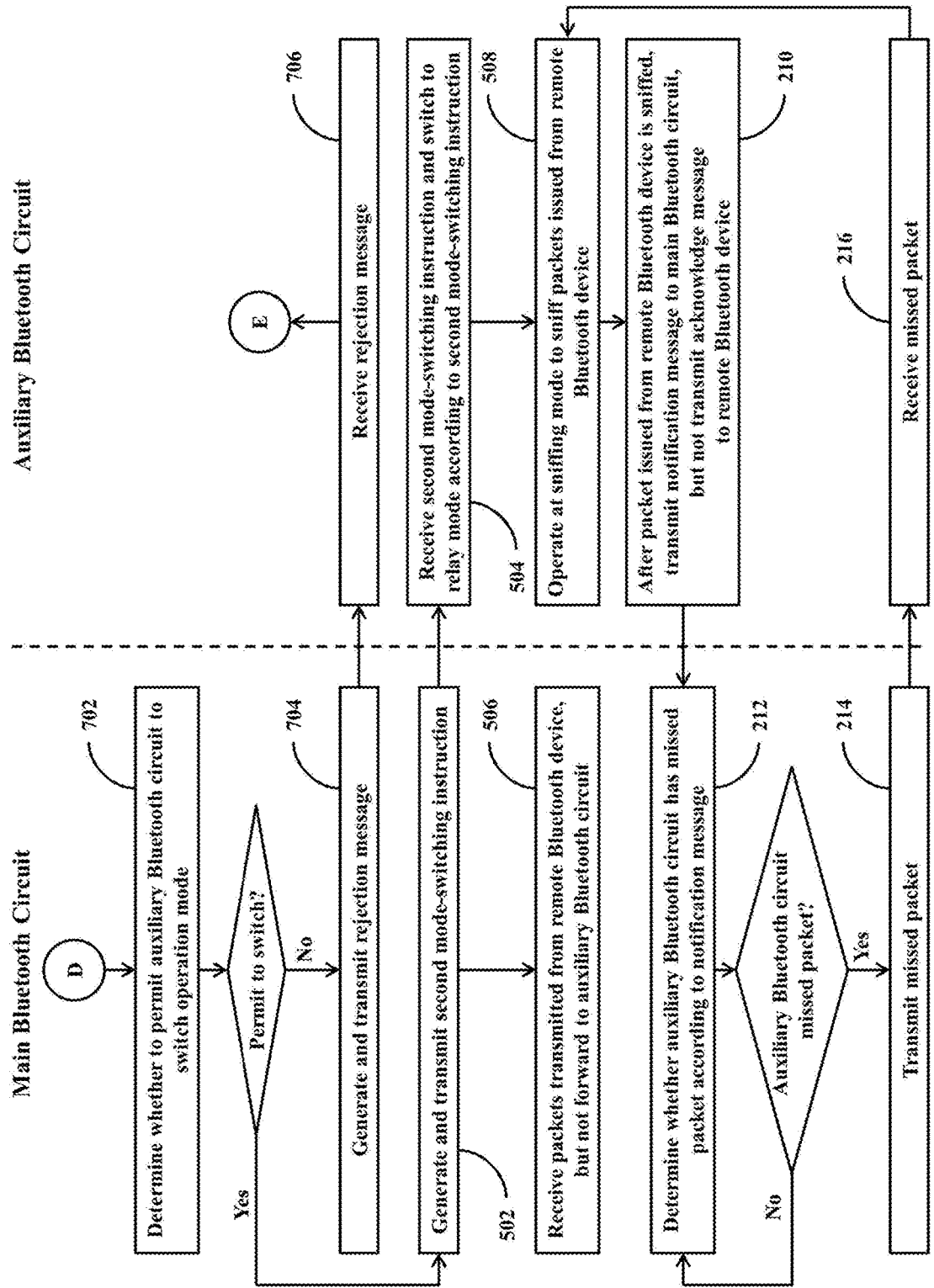

Please refer to FIG. 6 and FIG. 7, which collectively show a simplified flowchart of an operation method of the multi-member Bluetooth device 100 according to a third embodiment of the present disclosure.

In the embodiments of FIG. 6 and FIG. 7, in the period during which the auxiliary Bluetooth circuit operates at the relay mode, the first Bluetooth circuit 110 acting as the main Bluetooth circuit performs the operation 410 intermittently to check the data type of the packets transmitted from the remote Bluetooth device 102. However, after the first Bluetooth circuit 110 of this embodiment performs the operation 410, the first Bluetooth circuit 110 does not perform the aforementioned operation 412 but performs the operation 612 in FIG. 6 to generate and transmit a corresponding data type notification to respective auxiliary Bluetooth circuits.

For example, the first control circuit 117 may generate a data type notification corresponding to the data type of the packet transmitted currently from the remote Bluetooth device 102 and transmit the data type notification to all of the auxiliary Bluetooth circuits through the first Bluetooth communication circuit 111 in the operation 612. In practice, the above data type notification may be realized with various appropriate message formats.

In the operation 614, the auxiliary Bluetooth circuit receives the data type notification transmitted from the first Bluetooth circuit 110 and determines whether the data type of the packets transmitted from the remote Bluetooth device 102 changes or not according to the data type notification. For example, the second Bluetooth circuit 120 may receive the data type notification transmitted from the first Bluetooth circuit 110 through the second Bluetooth communication circuit 121 in the operation 614, and the second control circuit 127 may determine whether the data type of the packets transmitted from the remote Bluetooth device 102 changes or not according to the data type notification. In practice, the second control circuit 127 may temporarily store the data type notification transmitted earlier from the first Bluetooth circuit 110 in an appropriate storage circuit (which is not shown in figures), so as to compare the data type notification transmitted earlier to the data type notification transmitted currently from the first Bluetooth circuit 110.

If the current data type notification shows that the data type of the packet of the remote Bluetooth device 102 is still data without having sequence numbers, it usually means that the operation scenario of the multi-member Bluetooth device 100 does not change. In this situation, the second Bluetooth circuit 120 may repeat the aforementioned operation 408 to continue to operate at the relay mode.

On the contrary, if the current data type notification shows that the data type of the packet of the remote Bluetooth device 102 changes to be data with a sequence number, it usually means that the operation scenario of the multi-member Bluetooth device 100 has changed. In this situation, the second control circuit 127 may perform the operation 616 to generate a second mode-switching request and transmit the second mode-switching request to the first Bluetooth circuit 110 through the second Bluetooth communication circuit 121.

In the operation 618, the first Bluetooth circuit 110 receives the second mode-switching request transmitted from the second Bluetooth circuit 120 through the first Bluetooth communication circuit 111.

Afterwards, the first Bluetooth circuit 110 would perform the operation 702 in FIG. 7. In the operation 702, the first control circuit 117 of the first Bluetooth circuit 110 determines whether to permit the second Bluetooth circuit 120 to switch the operation mode. In this embodiment, after receiving the aforementioned second mode-switching request, the first control circuit 117 may determine whether to permit the second Bluetooth circuit 120 to switch the operation mode according to predetermined rules, and may perform corresponding subsequent operations according to the determining result.

If the first control circuit 117 decides not to permit the second Bluetooth circuit 120 to switch the operation mode after the determining operation, then the first control circuit 117 may perform the operation 704. On the contrary, if the first control circuit 117 decides to permit the second Bluetooth circuit 120 to switch the operation mode after the determining operation, then the first control circuit 117 may perform the aforementioned operation 502.

The second Bluetooth circuit 120 is allowed to switch from the relay mode to the sniffing mode after the first Bluetooth circuit 110 permits the second Bluetooth circuit 120 to switch the operation mode, and in the following stage, the second Bluetooth circuit 120 would sniff the packets issued from the remote Bluetooth device 102 by itself. Accordingly, the first Bluetooth circuit 110 does not need to forward the packets issued from the remote Bluetooth device 102 to the second Bluetooth circuit 120. As a result, it may increase the computing loading, power consumption, or heat generation of the second Bluetooth circuit 120, but it decreases the bandwidth requirement for data transmission between the first Bluetooth circuit 110 and the second Bluetooth circuit 120, and also decreases the computing loading, power consumption, or heat generation of the first Bluetooth circuit 110.

Therefore, after receiving the aforementioned second mode-switching request, the first control circuit 117 may evaluate if there exist any reasons showing that it is not suitable for switching the operation mode of the second Bluetooth circuit 120 at the time being. If not, then the first control circuit 117 may permit the second Bluetooth circuit 120 to switch the operation mode. For example, the first control circuit 117 may permit the second Bluetooth circuit 120 to switch the operation mode only if the current computing loading of the second Bluetooth circuit 120 is below a predetermined level, the remaining power of the second Bluetooth circuit 120 exceeds a predetermined threshold, and/or the temperature of the second Bluetooth circuit 120 is lower than a predetermined temperature. For another example, the first control circuit 117 may permit the second Bluetooth circuit 120 to switch the operation mode only if the current computing loading of the first Bluetooth circuit 110 is above a predetermined level, the remaining power of the first Bluetooth circuit 110 falls behind a predetermined threshold, and/or the temperature of the first Bluetooth circuit 110 is higher than a predetermined temperature.

In the operation 704, the first control circuit 117 may generate a rejection message which represents that the first Bluetooth circuit 110 does not permit the second Bluetooth circuit 120 to switch the operation mode, and transmits the rejection message to the second Bluetooth circuit 120 through the first Bluetooth communication circuit 111.

In the operation 706, the second Bluetooth circuit 120 may receive the rejection message transmitted from the first Bluetooth circuit 110 through the second Bluetooth communication circuit 121. In this situation, the second control circuit 127 controls the second Bluetooth circuit 120 to continue to operate at the relay mode according to the instruction of the rejection message and repeat the aforementioned operation 408.

In the operation 502, the first control circuit 117 generates a second mode-switching instruction for instructing the second Bluetooth circuit 120 to switch from the relay mode to the sniffing mode, and transmit the second mode-switching instruction to the second Bluetooth circuit 120 through the first Bluetooth communication circuit 111.

In the operation 504, the second Bluetooth communication circuit 121 receives the second mode-switching instruction transmitted from the first Bluetooth circuit 110, and the second control circuit 127 switches the operation mode of the second Bluetooth circuit 120 from the relay mode to the sniffing mode according to the second mode-switching instruction.

Afterwards, the multi-member Bluetooth device 100 may perform the aforementioned operation 506, operation 508, and operation 210 through operation 216.

Please note that the aforementioned operation approach that the first control circuit 117 first performs the determination procedure of the operation 702 and then performs the operation 502 after determining that the second Bluetooth circuit 120 is allowed to switch the operation mode is merely an example embodiment, rather than a restriction to the practical implementations. In practice, the first control circuit 117 may skip the aforementioned determination procedure of the operation 702 and directly proceed to perform the operation 502 after receiving the aforementioned second mode-switching request.

As can be appreciated from the foregoing descriptions, in the period during which the second Bluetooth circuit 120 operates at the relay mode, the first Bluetooth circuit 110 intermittently checks the data type of the packets transmitted from the remote Bluetooth device 102 and generates corresponding data type notifications, and the second Bluetooth circuit 120 indirectly determines whether the data type of the packets issued from the remote Bluetooth device 102 changes or not according to the data type notifications generated by the first Bluetooth circuit 110. The first Bluetooth circuit 110 does not instruct the second Bluetooth circuit 120 to switch to the sniffing mode as long as the second Bluetooth circuit 120 determines that the data type of the packets issued from the remote Bluetooth device 102 is still data without having sequence numbers, so as to avoid the difficulty of confirming whether the second Bluetooth circuit 120 misses any packets issued from the remote Bluetooth device 102 in the following stages.

The first Bluetooth circuit 110 instructs the second Bluetooth circuit 120 to switch the operation mode from the relay mode to the sniffing mode only if the second Bluetooth circuit 120 determines that the data type of the packets issued from the remote Bluetooth device 102 changes from data without having sequence numbers to data with a sequence number. After the second Bluetooth circuit 120 switches to the sniffing mode, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

Similarly, the multi-member Bluetooth device 100 may adaptively switch the operation mode of the third Bluetooth circuit 130 according to the change of the data type of the packets transmitted from the remote Bluetooth device 102 as elaborated above.

Accordingly, by adopting the operation approach of the aforementioned FIG. 6 and FIG. 7, the main Bluetooth circuit of the multi-member Bluetooth device 100 may adaptively switch the operation mode of the auxiliary Bluetooth circuit from the relay mode to the sniffing mode, and correspondingly adjust the cooperation between the main Bluetooth circuit and the auxiliary Bluetooth circuit when the data type of the packets transmitted from the remote Bluetooth device 102 changes from data without having sequence numbers to data with a sequence number. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 8:
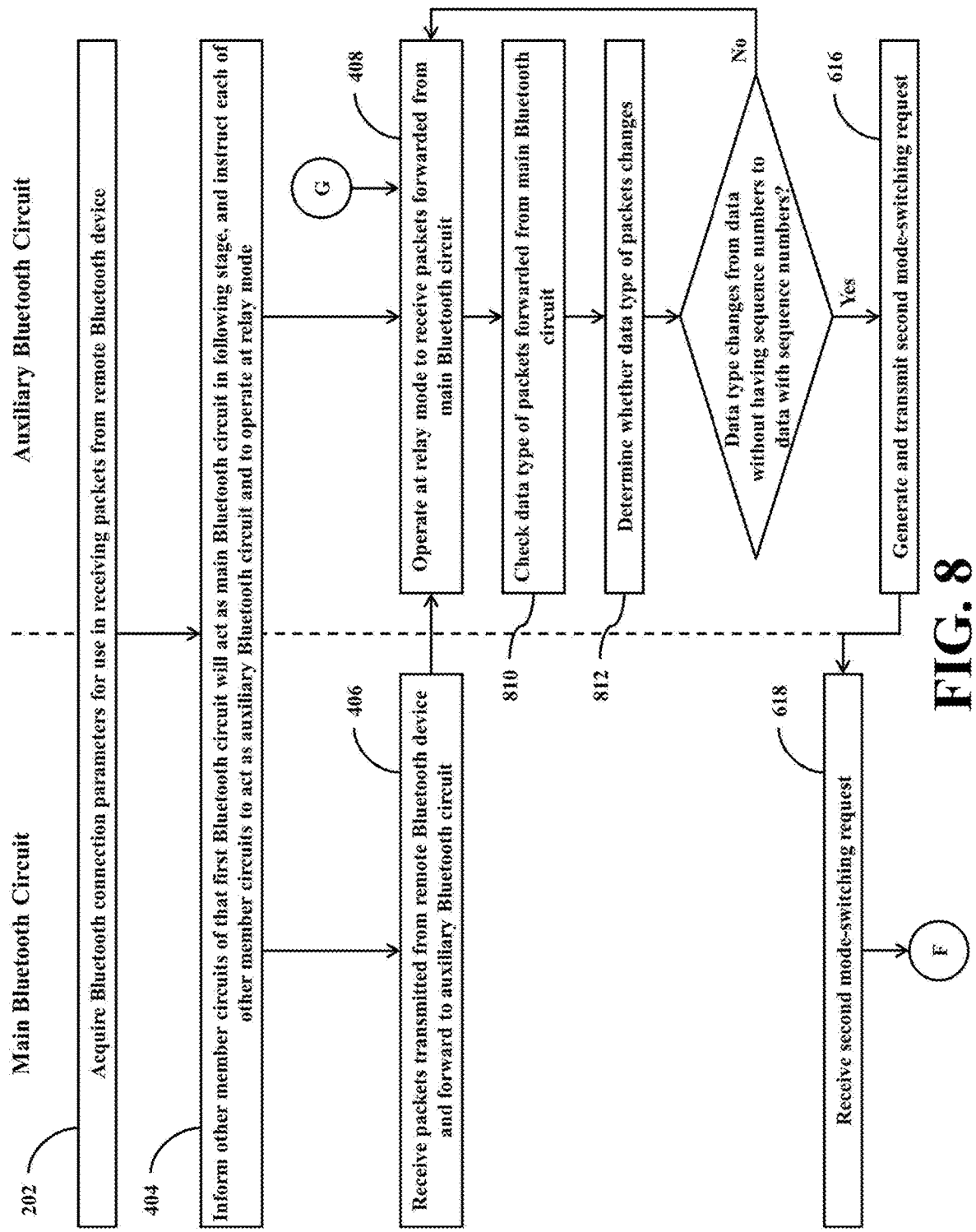
FIGS. 8~9 collectively show a simplified flowchart of an operation method of the multi-member Bluetooth device according to a fourth embodiment of the present disclosure.
Figure 9:
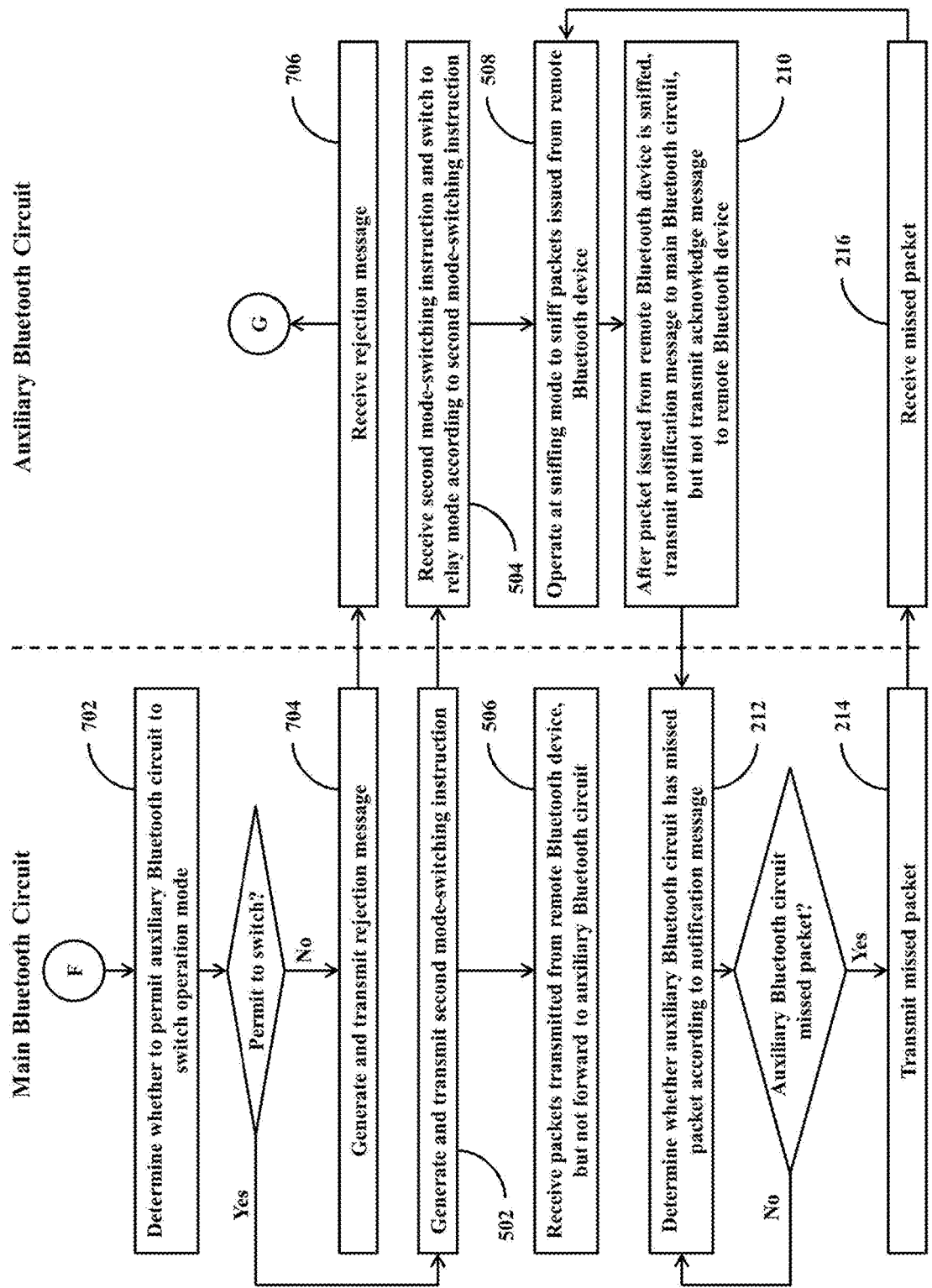

Please refer to FIG. 8 and FIG. 9, which collectively show a simplified flowchart of an operation method of the multi-member Bluetooth device 100 according to a fourth embodiment of the present disclosure.

In the embodiment of FIG. 8 and FIG. 9, the operation methods of the multi-member Bluetooth device 100 in the operation 202 and the operation 404 through the operation 408 are similar to corresponding operations described in the embodiments of FIG. 4 or FIG. 6. In other words, the auxiliary Bluetooth circuit operates at the relay mode to receive the packets without having sequence numbers forwarded from the main Bluetooth circuit. But in this embodiment, after performing the operation 408, the auxiliary Bluetooth circuit would perform the operation 810 in FIG. 8 to check the data type of the packets forwarded from the main Bluetooth circuit.

For example, the second control circuit 127 of the second Bluetooth circuit 120 may utilize the second packet parsing circuit 123 to parse contents in a particular field of the packets received by the second Bluetooth communication circuit 121 (i.e., packets forwarded from the first Bluetooth circuit 110) so as to acquire the data type of the above packet in the operation 810. In practice, the second control circuit 127 may read contents from a sequence number field in the packet transmitted from the first Bluetooth circuit 110 or contents from other predetermined fields, so as to classify the data type of the packet to be either data with a sequence number or data without having sequence numbers.

Then, the second control circuit 127 may perform the operation 812 to indirectly determine whether the data type of the packets issued from the remote Bluetooth device 102 changes by determining whether the data type of the packets forwarded from the first Bluetooth circuit 110 changes. In practice, the second control circuit 127 may temporarily store the data type of the packets transmitted earlier from the first Bluetooth circuit 110 in an appropriate storage circuit (which is not shown in figures), so as to compare the data type of the packets transmitted earlier to the data type of the packets transmitted currently from the first Bluetooth circuit 110.

If the data type of the packets transmitted currently from the first Bluetooth circuit 110 is still data without having sequence numbers, it means that the current data type of the packets of the remote Bluetooth device 102 is still data without having sequence numbers, and this usually means that the operation scenario of the multi-member Bluetooth device 100 does not change. In this situation, the first Bluetooth circuit 110 may repeat the aforementioned operation 406, and the second Bluetooth circuit 120 may continue to operate at the relay mode and repeat the aforementioned operation 408, operation 810, and operation 812.

On the contrary, if the data type of the packets transmitted currently from the first Bluetooth circuit 110 changes to be data with a sequence number, it means that the current data type of the packets of the remote Bluetooth device 102 changes to be data with a sequence number, and this usually means that the operation scenario of the multi-member Bluetooth device 100 has changed. In this situation, the second Bluetooth circuit 120 may perform the aforementioned operation 616 to generate a second mode-switching request and transmit the aforementioned second mode-switching request to the first Bluetooth circuit 110 through the second Bluetooth communication circuit 121.

In the operation 618, the first Bluetooth circuit 110 receives the second mode-switching request transmitted from the second Bluetooth circuit 120 through the first Bluetooth communication circuit 111.

Afterwards, the multi-member Bluetooth device 100 may perform the operations in FIG. 9. The foregoing descriptions regarding the operations of the corresponding operations in FIG. 7 are also applicable to the embodiments in FIG. 9. For the sake of brevity, the descriptions will not be repeated here.

As can be appreciated from the foregoing descriptions, in the period during which the second Bluetooth circuit 120 acting as the auxiliary Bluetooth circuit operates at the relay mode, the second Bluetooth circuit 120 intermittently checks the data type of the packets forwarded from the first Bluetooth circuit 110 so as to indirectly determines whether the packets issued from the remote Bluetooth device 102 changes from data without having sequence numbers to data with a sequence number. The first Bluetooth circuit 110 does not instruct the second Bluetooth circuit 120 to switch to the sniffing mode as long as the second Bluetooth circuit 120 determines that the data type of the packets issued from the remote Bluetooth device 102 is still data without having sequence numbers, so as to avoid the difficulty of confirming whether the second Bluetooth circuit 120 misses any packets issued from the remote Bluetooth device 102 in the following stages.

The first Bluetooth circuit 110 instructs the second Bluetooth circuit 120 to switch the operation mode from the relay mode to the sniffing mode only if the second Bluetooth circuit 120 determines that the data type of the packets issued from the remote Bluetooth device 102 changes from data without having sequence numbers to data with a sequence number. After the second Bluetooth circuit 120 switches to the sniffing mode, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

Similarly, the multi-member Bluetooth device 100 may adaptively switch the operation mode of the third Bluetooth circuit 130 according to the change of the data type of the packets transmitted from the remote Bluetooth device 102 as elaborated above.

Accordingly, by adopting the operation approach of the aforementioned FIG. 8 and FIG. 9, the main Bluetooth circuit of the multi-member Bluetooth device 100 may adaptively switch the operation mode of the auxiliary Bluetooth circuit from the relay mode to the sniffing mode, and correspondingly adjust the cooperation between the main Bluetooth circuit and the auxiliary Bluetooth circuit when the auxiliary Bluetooth circuit determines that the data type of the packets issued from the remote Bluetooth device 102 changes from data without having sequence numbers to data with a sequence number. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 10:
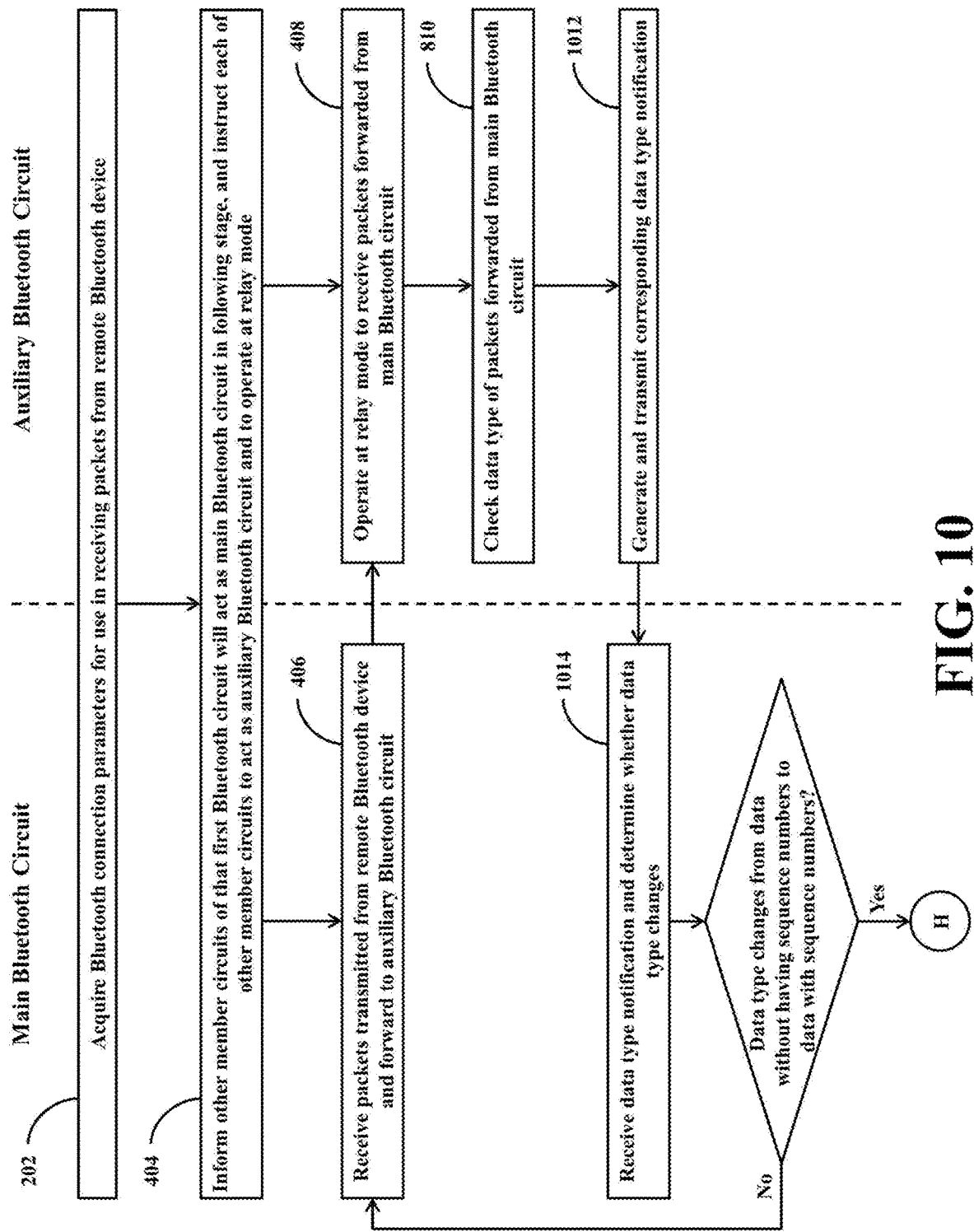
FIGS. 10~11 collectively show a simplified flowchart of an operation method of the multi-member Bluetooth device according to a fifth embodiment of the present disclosure.
Figure 11:
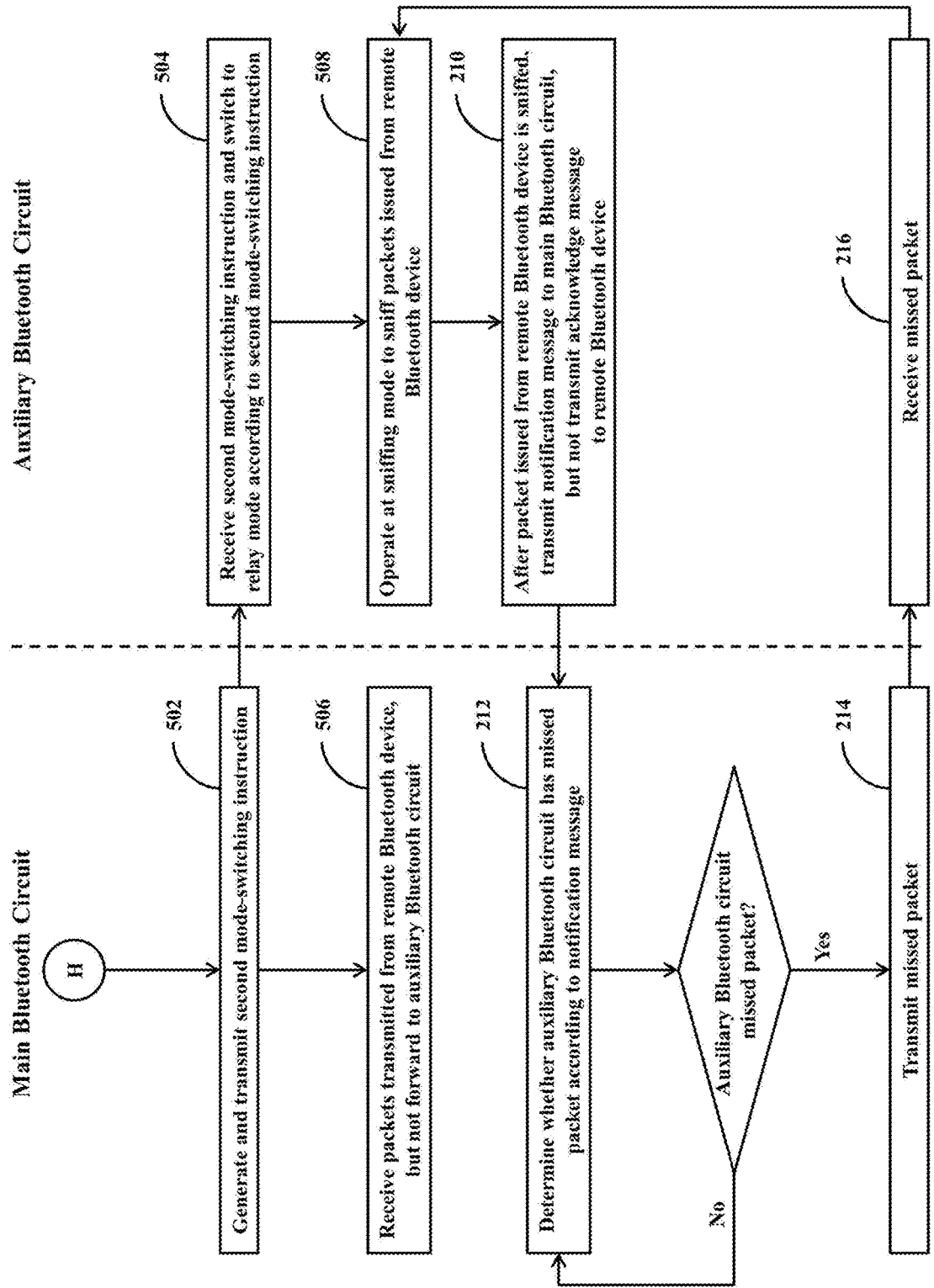

Please refer to FIG. 10 and FIG. 11, which collectively show a simplified flowchart of an operation method of the multi-member Bluetooth device 100 according to a fifth embodiment of the present disclosure.

In the embodiment of FIG. 10 and FIG. 11, the operation methods of the multi-member Bluetooth device 100 in the operation 202 and the operation 404 through the operation 810 are similar to the embodiment described in FIG. 8. In other words, the auxiliary Bluetooth circuit operates at the relay mode to receive the packets without having sequence numbers forwarded from the main Bluetooth circuit. But in this embodiment, after performing the operation 810, the auxiliary Bluetooth circuit would perform the operation 1012 in FIG. 10 instead of the operation 812 in FIG. 8, so as to generate a corresponding data type notification to the main Bluetooth circuit.

For example, the second control circuit 127 of the second Bluetooth circuit 120 may generate a data type notification corresponding to the data type of the packets currently forwarded from the first Bluetooth circuit 110 and transmit the data type notification to the first Bluetooth circuit 110 through the second Bluetooth communication circuit 121 in the operation 1012. In practice, the above data type notification may be realized with various appropriate message formats.

In the operation 1014, the first Bluetooth circuit 110 may receive the data type notification transmitted from the second Bluetooth circuit 120 through the first Bluetooth communication circuit 111, and the first control circuit 117 may indirectly determines whether the data type of the packets issued from the remote Bluetooth device 102 changes or not according to the data type notification. In practice, the first control circuit 117 may temporarily store the data type notification transmitted earlier from the second Bluetooth circuit 120 in an appropriate storage circuit (which is not shown in figures), so as to compare the data type notification transmitted earlier to the data type notification transmitted currently from the second Bluetooth circuit 120.

If the current data type notification shows that the data type of the packets issued from the remote Bluetooth device 102 is still data without having sequence numbers, it usually means that the operation scenario of the multi-member Bluetooth device 100 does not change. In this situation, the first Bluetooth circuit 110 may repeat the aforementioned operation 406.

On the contrary, if the current data type notification shows that the data type of the packets issued from the remote Bluetooth device 102 changes to be data with a sequence number, it usually means that the operation scenario of the multi-member Bluetooth device 100 has changed. In this situation, the first control circuit 117 may perform the operation 502 in FIG. 11 to generate a second mode-switching instruction for instructing the second Bluetooth circuit 120 to switch from the relay mode to the sniffing mode, and may transmit the second mode-switching instruction to the second Bluetooth circuit 120 through the first Bluetooth communication circuit 111.

Afterwards, the multi-member Bluetooth device 100 may perform the remaining operations in FIG. 11. The foregoing descriptions regarding the operations of the corresponding operations in FIG. 5 are also applicable to the embodiments in FIG. 11. For the sake of brevity, the descriptions will not be repeated here.

As can be appreciated from the foregoing descriptions, in the period during which the second Bluetooth circuit 120 operates at the relay mode, the second Bluetooth circuit 120 intermittently checks the data type of the packets transmitted from the first Bluetooth circuit 110 and generates corresponding data type notifications, and the first Bluetooth circuit 110 indirectly determines whether the data type of the packets issued from the remote Bluetooth device 102 changes or not according to the data type notifications generated by the second Bluetooth circuit 120. The first Bluetooth circuit 110 does not instruct the second Bluetooth circuit 120 to switch to the sniffing mode as long as the first Bluetooth circuit 110 determines that the data type of the packets issued from the remote Bluetooth device 102 is still data without having sequence numbers, so as to avoid the difficulty of confirming whether the second Bluetooth circuit 120 misses any packets issued from the remote Bluetooth device 102 in the following stages.

The first Bluetooth circuit 110 instructs the second Bluetooth circuit 120 to switch the operation mode from the relay mode to the sniffing mode only if the first Bluetooth circuit 110 determines that the data type of the packets issued from the remote Bluetooth device 102 changes from data without having sequence numbers to data with a sequence number. After the second Bluetooth circuit 120 switches to the sniffing mode, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

Similarly, the multi-member Bluetooth device 100 may adaptively switch the operation mode of the third Bluetooth circuit 130 according to the change of the data type of the packets transmitted from the remote Bluetooth device 102 as elaborated above.

Accordingly, by adopting the operation approach of the aforementioned FIG. 10 and FIG. 11, the main Bluetooth circuit of the multi-member Bluetooth device 100 may adaptively switch the operation mode of the auxiliary Bluetooth circuit from the relay mode to the sniffing mode, and correspondingly adjust the cooperation between the main Bluetooth circuit and the auxiliary Bluetooth circuit when the data type of the packets transmitted from the remote Bluetooth device 102 changes from data without having sequence numbers to data with a sequence number. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Please note that the quantity of the member circuits in the multi-member Bluetooth device 100 in each of the foregoing embodiments may be reduced to two, or may be increased depending on the requirement of practical circuit applications.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-member Bluetooth device (100) utilized to operably conduct data transmission with a remote Bluetooth device (102), the multi-member Bluetooth device (100) comprising:
   a main Bluetooth circuit (110), comprising:
      a first Bluetooth communication circuit (111);
      a first packet parsing circuit (113), arranged to operably parse packets received by the first Bluetooth communication circuit (111); and
      a first control circuit (117), coupled with the first Bluetooth communication circuit (111) and the first packet parsing circuit (113); and
   an auxiliary Bluetooth circuit (120), arranged to selectably operate at a sniffing mode or a relay mode, the auxiliary Bluetooth circuit (120) comprising:
      a second Bluetooth communication circuit (121);
      a second packet parsing circuit (123), arranged to operably parse packets received by the second Bluetooth communication circuit (121); and
      a second control circuit (127), coupled with the second Bluetooth communication circuit (121) and the second packet parsing circuit (123);
   wherein in a period during which the auxiliary Bluetooth circuit (120) operates at the sniffing mode, the first control circuit (117) utilizes the first Bluetooth communication circuit (111) to receive packets transmitted from the remote Bluetooth device (102), and the second control circuit (127) utilizes the second Bluetooth communication circuit (121) to sniff packets issued from the remote Bluetooth device (102);
   in a situation of that a data type of the packets transmitted from the remote Bluetooth device (102) changes, the auxiliary Bluetooth circuit (120) switches from the sniffing mode to the relay mode; and
   in a period during which the auxiliary Bluetooth circuit (120) operates at the relay mode, the second control circuit (127) does not utilize the second Bluetooth communication circuit (121) to sniff the packets issued from the remote Bluetooth device (102), the first control circuit (117) utilizes the first Bluetooth communication circuit (111) to receive the packets transmitted from the remote Bluetooth device (102), and utilizes the first Bluetooth communication circuit (111) to forward received packets to the auxiliary Bluetooth circuit (120), and the second control circuit (127) utilizes the second Bluetooth communication circuit (121) to receive packets forwarded from the first Bluetooth communication circuit (111).

2. The multi-member Bluetooth device (100) of claim 1, wherein in the period during which the auxiliary Bluetooth circuit (120) operates at the sniffing mode, the first control circuit (117) is further arranged to operably check the data type of the packets transmitted from the remote Bluetooth device (102), and to operably determine whether the data type changes;

wherein if the data type changes from data with a sequence number to data without having sequence numbers, then the first control circuit (117) transmits a mode-switching instruction to the second Bluetooth communication circuit (121) through the first Bluetooth communication circuit (111), so as to instruct the auxiliary Bluetooth circuit (120) to switch from the sniffing mode to the relay mode.

3. The multi-member Bluetooth device (100) of claim 2, wherein in the period during which the auxiliary Bluetooth circuit (120) operates at the sniffing mode, the first control circuit (117) is further arranged to operably transmit packets issued from the remote Bluetooth device (102) but missed by the second Bluetooth communication circuit (121) to the second Bluetooth communication circuit (121) through the first Bluetooth communication circuit (111).

4. A main Bluetooth circuit (110) of a multi-member Bluetooth device (100) utilized to operably conduct data transmission with a remote Bluetooth device (102) and comprising the main Bluetooth circuit (110) and an auxiliary Bluetooth circuit (120) which selectably operates at a sniffing mode or a relay mode, the main Bluetooth circuit (110) comprising:

a first Bluetooth communication circuit (111);
a first packet parsing circuit (113), arranged to operably parse packets received by the first Bluetooth communication circuit (111); and
a first control circuit (117), coupled with the first Bluetooth communication circuit (111) and the first packet parsing circuit (113);
wherein in a period during which the auxiliary Bluetooth circuit (120) operates at the sniffing mode, the first control circuit (117) utilizes the first Bluetooth communication circuit (111) to receive packets transmitted from the remote Bluetooth device (102), and the auxiliary Bluetooth circuit (120) sniffs packets issued from the remote Bluetooth device (102);
in a situation of that a data type of the packets transmitted from the remote Bluetooth device (102) changes, the auxiliary Bluetooth circuit (120) switches from the sniffing mode to the relay mode; and
in a period during which the auxiliary Bluetooth circuit (120) operates at the relay mode, the auxiliary Bluetooth circuit (120) does not sniff the packets issued from the remote Bluetooth device (102), the first control circuit (117) utilizes the first Bluetooth communication circuit (111) to receive the packets transmitted from the remote Bluetooth device (102), and utilizes the first Bluetooth communication circuit (111) to forward received packets to the auxiliary Bluetooth circuit (120).

5. The main Bluetooth circuit (110) of claim 4, wherein in the period during which the auxiliary Bluetooth circuit (120) operates at the sniffing mode, the first control circuit (117) is further arranged to operably check the data type of the packets transmitted from the remote Bluetooth device (102), and to operably determine whether the data type changes;

wherein if the data type of the packets transmitted from the remote Bluetooth device (102) changes from data with a sequence number to data without having sequence numbers, then the first control circuit (117) transmits a mode-switching instruction to the auxiliary Bluetooth circuit (120) through the first Bluetooth communication circuit (111), so as to instruct the auxiliary Bluetooth circuit (120) to switch from the sniffing mode to the relay mode.

6. The main Bluetooth circuit (110) of claim 5, wherein in the period during which the auxiliary Bluetooth circuit (120) operates at the sniffing mode, the first control circuit (117) is further arranged to operably transmit packets issued from the remote Bluetooth device (102) but missed by the auxiliary Bluetooth circuit (120) to the auxiliary Bluetooth circuit (120) through the first Bluetooth communication circuit (111).

7. An auxiliary Bluetooth circuit (120) of a multi-member Bluetooth device (100) utilized to operably conduct data transmission with a remote Bluetooth device (102) and comprising a main Bluetooth circuit (110) and the auxiliary Bluetooth circuit (120), the auxiliary Bluetooth circuit (120) comprising:

a second Bluetooth communication circuit (121);
a second packet parsing circuit (123), arranged to operably parse packets received by the second Bluetooth communication circuit (121); and
a second control circuit (127), coupled with the second Bluetooth communication circuit (121) and the second packet parsing circuit (123), arranged to operably control operations of the auxiliary Bluetooth circuit (120) under a sniffing mode and a relay mode;
wherein in a period during which the auxiliary Bluetooth circuit (120) operates at the sniffing mode, the main Bluetooth circuit (110) receives packets transmitted from the remote Bluetooth device (102), and the second control circuit (127) utilizes the second Bluetooth communication circuit (121) to sniff packets issued from the remote Bluetooth device (102);
in a situation of that a data type of the packets transmitted from the remote Bluetooth device (102) changes, the auxiliary Bluetooth circuit (120) switches from the sniffing mode to the relay mode; and
in a period during which the auxiliary Bluetooth circuit (120) operates at the relay mode, the second control circuit (127) does not utilize the second Bluetooth communication circuit (121) to sniff the packets issued from the remote Bluetooth device (102), the main Bluetooth circuit (110) receives the packets transmitted from the remote Bluetooth device (102) and forwards received packets to the auxiliary Bluetooth circuit (120), and the second control circuit (127) utilizes the second Bluetooth communication circuit (121) to receive packets forwarded from the main Bluetooth circuit (110).

8. The auxiliary Bluetooth circuit (120) of claim 7, wherein in the period during which the auxiliary Bluetooth circuit (120) operates at the sniffing mode, the main Bluetooth circuit (110) checks a data type of the packets transmitted from the remote Bluetooth device (102), and determines whether the data type changes;

wherein if the data type of the packets transmitted from the remote Bluetooth device (102) changes from data with a sequence number to data without having sequence numbers, then the second Bluetooth communication circuit (121) receives a mode-switching instruction generated by the main Bluetooth circuit (110), and the second control circuit (127) switches the auxiliary Bluetooth circuit (120) from the sniffing mode to the relay mode according to the mode-switching instruction.

9. The auxiliary Bluetooth circuit (120) of claim 8, wherein in the period during which the auxiliary Bluetooth circuit (120) operates at the sniffing mode, the second control circuit (127) further utilizes the second Bluetooth communication circuit (121) to receive the packets transmitted from the main Bluetooth circuit (110), so as to acquire packets issued from the remote Bluetooth device (102) but missed by the second Bluetooth communication circuit (121).

\* \* \* \* \*